United States Patent [19]

Saidman et al.

[11] Patent Number: 5,330,783

[45] Date of Patent: Jul. 19, 1994

[54] METHOD AND APPARATUS FOR FORMING AND DISPENSING SINGLE AND MULTIPLE PHASE COATING MATERIAL CONTAINING FLUID DILUENT

[75] Inventors: Laurence B. Saidman, Avon Lake; Timothy E. Wilson, Amherst; Stephen L. Merkel, Bay Village; James C. Smith, Amherst, all of Ohio

[73] Assignee: Nordson Corporation, Westlake, Ohio

[21] Appl. No.: 953,973

[22] Filed: Sep. 30, 1992

Related U.S. Application Data

[60] Division of Ser. No. 728,051, Jun. 28, 1991, Pat. No. 5,215,253, which is a continuation-in-part of Ser. No. 662,401, Feb. 27, 1991, abandoned, which is a continuation-in-part of Ser. No. 575,203, Aug. 31, 1990, abandoned.

[51] Int. Cl.$^5$ ............................................. B05D 1/02
[52] U.S. Cl. .................................. 427/8; 427/421; 427/422
[58] Field of Search .............. 427/421, 8, 422; 137/3, 137/5, 7; 366/151, 152, 160, 161, 162

[56] References Cited

U.S. PATENT DOCUMENTS

| | | | |
|---|---|---|---|
| 1,483,225 | 2/1924 | Hammett | 73/861.92 |
| 1,511,765 | 10/1924 | Latham | 73/861.92 |
| 1,585,255 | 5/1926 | McFadden | 73/861.92 |
| 3,025,464 | 3/1962 | Bond | 324/61 |
| 3,133,437 | 5/1964 | Remke et al. | 73/53 |
| 3,314,005 | 4/1967 | Whitener | 324/30 |
| 3,751,644 | 8/1973 | Mayer | 364/502 |
| 3,764,069 | 10/1973 | Runstadler, Jr. et al. | 239/8 |
| 3,774,238 | 11/1973 | Hardway, Jr. | 324/61 |
| 3,778,705 | 12/1973 | Maltby | 324/61 |
| 4,059,466 | 11/1977 | Scholl et al. | 156/78 |

(List continued on next page.)

FOREIGN PATENT DOCUMENTS

| | | |
|---|---|---|
| 0733732 | 5/1966 | Canada . |
| 0743666 | 9/1966 | Canada . |
| 0246797 | 11/1987 | European Pat. Off. . |
| 0259689 | 3/1988 | European Pat. Off. . |
| 0321607 | 6/1989 | European Pat. Off. . |
| 0350909 | 1/1990 | European Pat. Off. . |
| 0350910 | 1/1990 | European Pat. Off. . |
| 0388915 | 9/1990 | European Pat. Off. . |
| 0388916 | 9/1990 | European Pat. Off. . |
| 0388923 | 9/1990 | European Pat. Off. . |

*Primary Examiner*—Shrive Beck
*Assistant Examiner*—David M. Maiorana
*Attorney, Agent, or Firm*—Ruden, Barnett, McClosky, Smith, Schuster & Russell

[57] ABSTRACT

A method and apparatus for forming and dispensing a coating material formulation or solution containing a liquid coating composition and a fluid diluent such as a supercritical fluid comprises a supply for the liquid coating composition, a supply for the fluid diluent, a mixer for combining the two components to form the coating material solution or formulation, and a control system for monitoring a parameter of the formulation which can be correlated to the fluid diluent content and/or liquid coating composition content of the formulation, and for monitoring the pressure of the formulation at selected locations within the system. The control system is effective to open or close the supply of fluid diluent and/or liquid coating composition in accordance with variations in the formulation parameter which is being sensed, and in response to pressure changes within the system, to maintain single or multiple phase coating material formulations, to account for changes in a parameter of the liquid coating composition and to ensure that the desired ratio of fluid diluent to liquid coating composition is maintained in the formulation which is supplied to coating dispensers for deposition onto a substrate.

30 Claims, 13 Drawing Sheets

U.S. PATENT DOCUMENTS

| | | | |
|---|---|---|---|
| 4,059,714 | 11/1977 | Scholl et al. | 428/317.5 |
| 4,156,754 | 5/1979 | Cobbs, Jr. et al. | 428/306.6 |
| 4,174,498 | 11/1979 | Preikschat | 324/57 |
| 4,181,881 | 1/1980 | Preikschat | 324/57 |
| 4,193,745 | 3/1980 | Hamilton et al. | 418/9 |
| 4,200,207 | 4/1980 | Akers et al. | 222/190 |
| 4,212,545 | 7/1980 | Lovasz et al. | 366/152 |
| 4,247,581 | 1/1981 | Cobbs, Jr. et al. | 427/373 |
| 4,259,402 | 3/1981 | Cobbs, Jr. et al. | 428/317.5 |
| 4,288,741 | 9/1981 | Dechene et al. | 324/61 |
| 4,301,119 | 11/1981 | Cobbs, Jr. et al. | 422/133 |
| 4,371,096 | 2/1983 | Scholl et al. | 222/190 |
| 4,405,063 | 9/1983 | Wydro et al. | 222/146.5 |
| 4,423,161 | 12/1983 | Cobbs, Jr. et al. | 521/73 |
| 4,505,406 | 3/1985 | Cobbs, Jr. et al. | 222/135 |
| 4,505,957 | 3/1985 | Cobbs, Jr. et al. | 427/422 |
| 4,527,712 | 7/1985 | Cobbs, Jr. et al. | 222/1 |
| 4,553,701 | 11/1985 | Rehman et al. | 239/432 |
| 4,601,645 | 7/1986 | Schmitkons | 418/9 |
| 4,627,465 | 12/1986 | Kolibas et al. | 137/563 |
| 4,630,774 | 12/1986 | Rehman et al. | 239/8 |
| 4,632,314 | 12/1986 | Smith et al. | 239/433 |
| 4,654,802 | 3/1987 | Davis | 364/502 |
| 4,657,047 | 4/1987 | Kolibas | 137/881 |
| 4,774,680 | 9/1988 | Agar | 364/550 |
| 4,778,631 | 10/1988 | Cobbs, Jr. et al. | 261/128 |
| 4,779,762 | 10/1988 | Klein et al. | 222/52 |
| 4,809,129 | 2/1989 | Hansen, III et al. | 361/284 |
| 4,882,107 | 11/1989 | Cavender et al. | 264/51 |
| 4,912,381 | 3/1990 | Culberson | 318/561 |
| 4,923,720 | 5/1990 | Lee et al. | 427/422 |
| 4,939,468 | 7/1990 | Takeuchi | 324/690 |
| 5,009,367 | 4/1991 | Nielsen | 239/3 |
| 5,027,742 | 7/1991 | Lee et al. | 118/300 |
| 5,057,342 | 10/1991 | Hoy et al. | 427/422 |

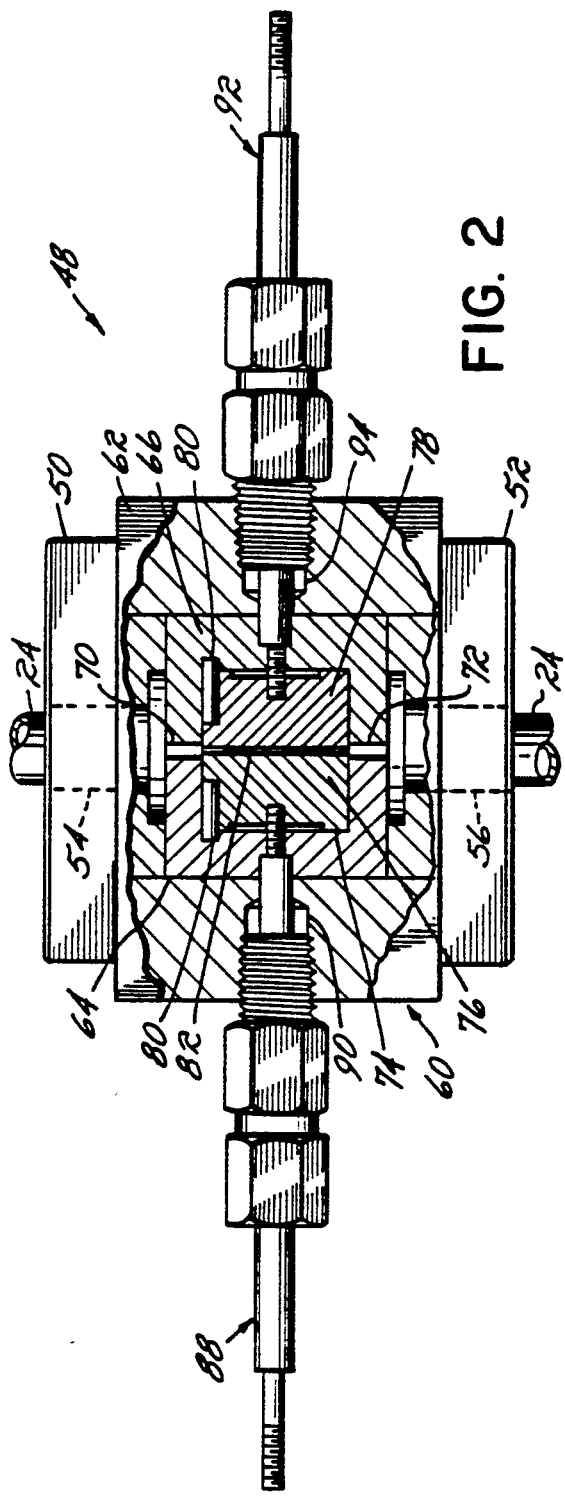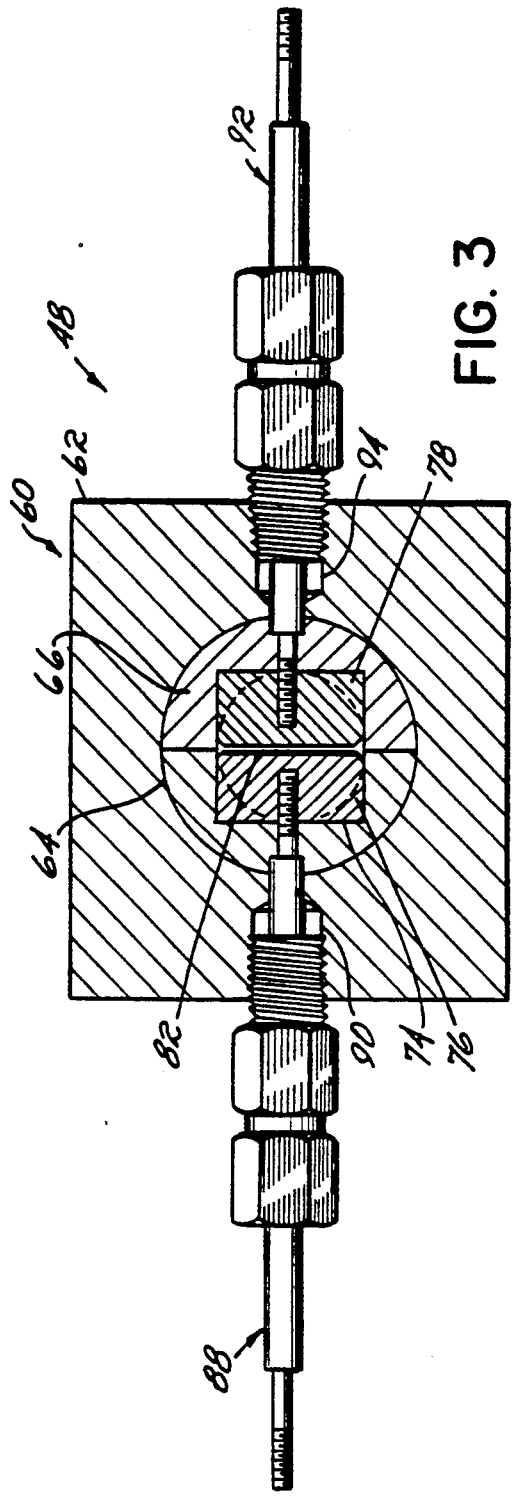

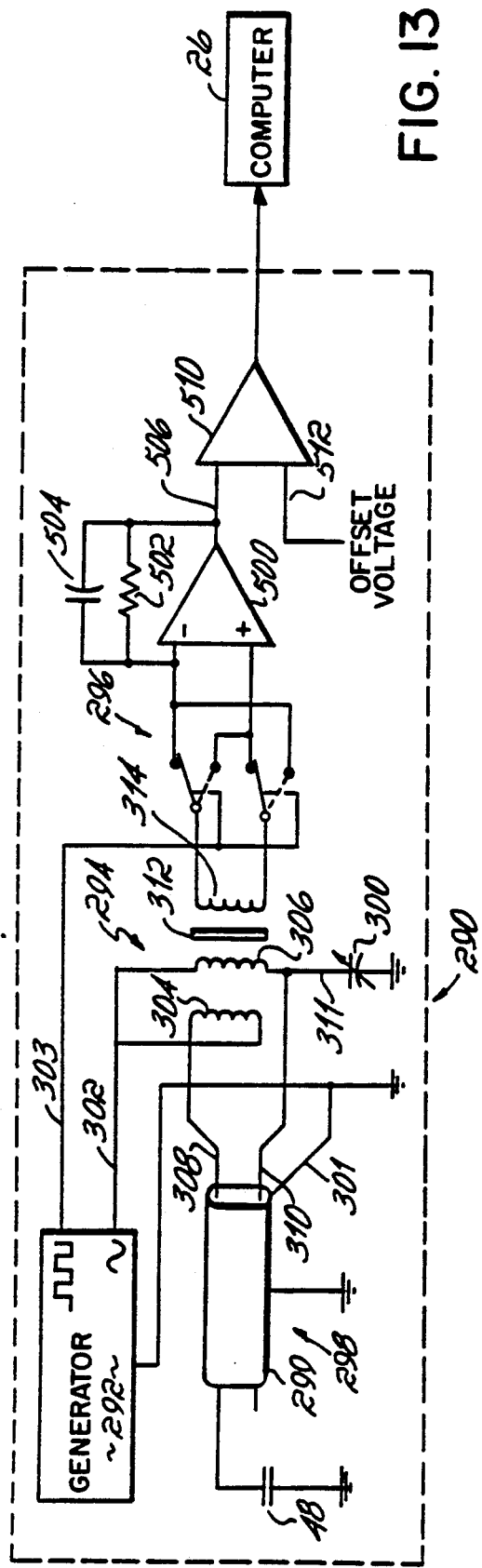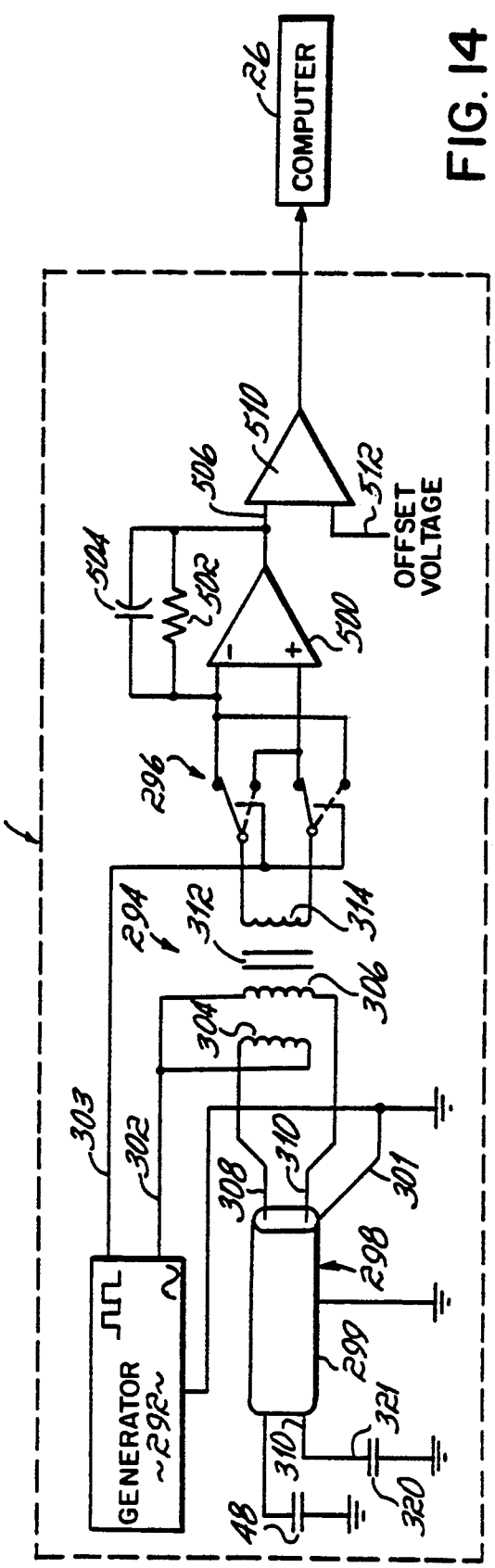

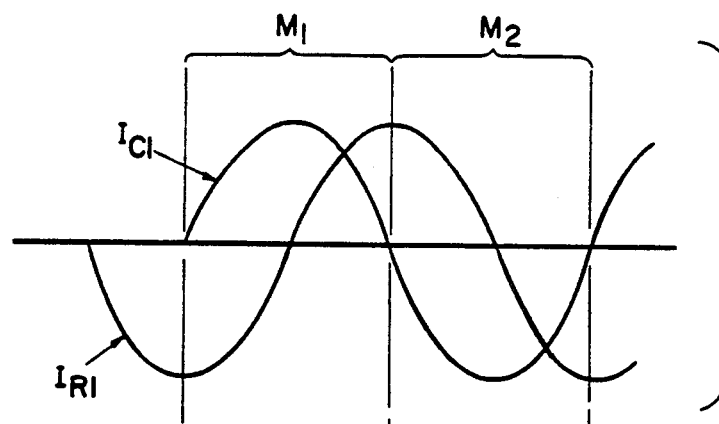
FIG. 13A
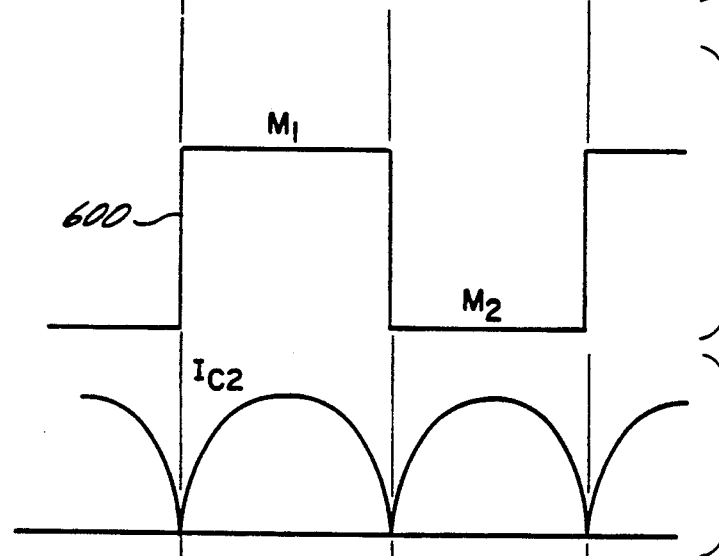
FIG. 13B
FIG. 13C
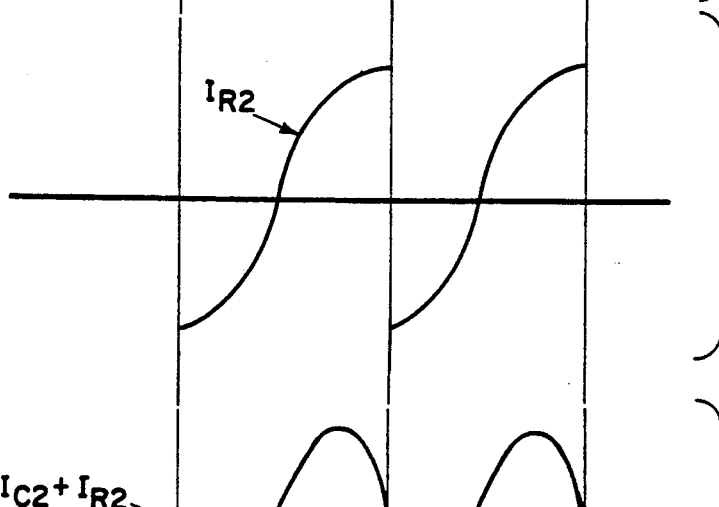
FIG. 13D
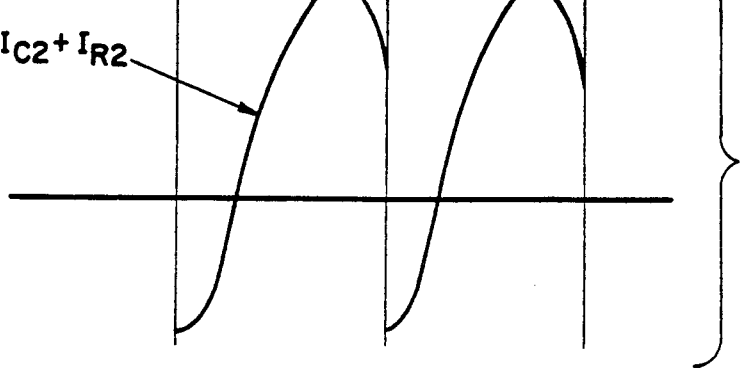
FIG. 13E

METHOD AND APPARATUS FOR FORMING AND DISPENSING SINGLE AND MULTIPLE PHASE COATING MATERIAL CONTAINING FLUID DILUENT

This is a division of application Ser. No. 07/728,051, filed Jun. 28, 1991 now U.S. Pat. No. 5,215,253, which is a continuation-in-part of application Ser. No. 07/662,401, filed Feb. 27, 1991, now abandoned which is a continuation-in-part of application Ser. No. 07/575,203, now abandoned.

FIELD OF THE INVENTION

This invention relates to coating systems, and, more particularly, to a method and apparatus for combining a liquid coating composition with a supercritical fluid as a diluent to produce a coating material solution or formulation in which the relative proportion of the supercritical fluid in the solution is monitored and adjusted before transmission to coating dispensers for deposition onto a substrate.

BACKGROUND OF THE INVENTION

A major problem of the coating and finishing industry, both in terms of raw material usage and environmental effects, concerns the solvent components of paint. In a spray coating application of a resinous material, the resinous material is typically dissolved in an organic solvent provided with viscosity suitable for spraying. This is required because it has been found that at each stage of the process for atomizing and conveying a resinous material in liquid form to a substrate, the liquid resists high speed deformation. Organic solvents are added to the resinous liquid because they have the effect of separating the molecules of resinous material and facilitating their relative movement making the solution more deformable at high speeds and therefore more susceptible to atomization. Substantial effort has been expended to reduce the volume of liquid solvent components in preparing high solids coating compositions containing about 50% by volume of polymeric and pigmentary solids. Nevertheless, most high solids coating compositions still contain from 15 to 40% by volume of liquid solvent components.

The problem with such a high volume content of liquid solvents in coating compositions is that during handling, atomization or deposition of the coating compositions, the solvents escape and can become air contaminants if not properly trapped. Once the coating composition is applied to a substrate, its solvents escape from the film by evaporation and such evaporated solvents can also contaminate the surrounding atmosphere. Additionally, since most solvents react with oxidants, pollution problems of toxicity, odor and smog may be created. Attempts at overcoming such environmental problems have proven to be costly and relatively inefficient.

It has previously been proposed in Cobbs U.S. Pat. No. 4,247,581 to reduce solvent content in paint by mixing a liquid or gas blowing agent into the paint to produce an easily atomized foamed solution just prior to the spray orifice. Rehman et al U.S. Pat. No. 4,630,774 improved on this concept by designing a foaming chamber and turbulence inducing device into the gun to better control the formation of the foam prior to the spray orifice. U.S. Pat. Nos. 4,505,406; 4,505,957; and, 4,527,712 also disclose concepts for intermixing liquid or gas blowing agents into paint formulations to reduce solvents.

More recently, U.S. Pat. No. 4,923,720 to Lee et al disclosed a method and apparatus for the production of a coating formulation in which a substantial amount of the liquid solvent component is removed and replaced with a supercritical fluid such as supercritical carbon dioxide which functions as a diluent to enhance the application properties of the coating formulation. The supercritical carbon dioxide and some liquid solvent material, e.g., about two-thirds less than is required in other coating compositions, are intermixed with polymeric and pigmentary solids to form a coating material solution or formulation having a viscosity which facilitates atomization through an airless coating dispenser. As the coating material formulation is discharged from the dispensing devices toward a substrate, the supercritical carbon dioxide "flashes off" or vaporizes to assist in atomization of the high solids coating composition and to reduce drying time of the composition on the substrate. Such coating material formulation like the earlier prior art has the advantage of substantially reducing the adverse environmental effects caused by coating compositions having a high solvent content.

It has been observed that in order to produce a coating material solution or formulation with the desired application characteristics, the relative proportion of the liquid coating composition and supercritical carbon dioxide should be maintained at a predetermined ratio or within a predetermined range. The predetermined ratio or range will produce a formulation which is either "single phase" or "multiple phase". The formulation is single phase when the supercritical fluid is dissolved or dispersed within the liquid coating composition to form a single continuous phase of material having a given composition and density. The formulation is multiphase when two or more phases of material are present in the formulation. Where the multiphase formulation has two phases, for example, each phase will have a different composition and density. Normally a single phase formulation will become a two phase formulation as more supercritical carbon dioxide is added into the formulation. Very often the first phase will be a continuous phase and the second phase will be a dispersed phase, e.g., a phase dispersed as bubbles in the first phase, although a continuous second phase would also be possible.

The Lee et al U.S. Pat. No. 4,923,720 discloses an apparatus in which a liquid coating composition and a supercritical fluid are supplied from separate sources to a mixer wherein the two components are combined to form a coating material solution or formulation which is delivered to one or more coating dispensers for deposition onto a substrate. In the embodiment of the system disclosed in the Lee et al patent, the liquid coating composition and supercritical fluid are each introduced into the system by a separate piston pump. These two piston pumps are slaved together by a shaft which extends between the pistons of the two pumps, and the shaft position is adjusted to control the length of the piston stroke of each pump. The length of each piston stroke, in turn, governs the volume of the liquid coating composition and the volume of supercritical fluid entering the system.

One problem with the pumping unit employed in the Lee et al U.S. Pat. No. 4,923,720 is that control of the relative proportion of liquid coating composition and supercritical fluid is difficult. Adjustment of the volume of one material entering the systems automatically produces a change or adjustment in the volume of the other material. This is because the two piston pumps are slaved together by a shaft which is connected between the pistons thereof such that adjustment of the position of the shaft along the piston of one pump to vary the stroke thereof, causes the shaft to move along the piston of the other pump and adjust its stroke. No provision is made in such system for adjustment of the volume of one material introduced into the system independently of the other material. In addition, no provision is made for the possibility that the pumps may cavitate. Thus, volumetric metering may not give accurate mass ratio of the two materials. If the liquid coating composition has a high viscosity, the piston chamber may not completely fill. Likewise, any pressure drop which the supercritical fluid goes through in entering the pump can cause it to vaporize and fill up a portion of the pump chamber with gas.

Another problem with the pumping arrangement in systems of the type disclosed in the Lee et al U.S. Pat. No. 4,923,720 is that piston pumps inherently produce instantaneous flow variations which, in turn, result in errors in the desired ratio of the liquid coating composition and supercritical fluid forming the coating material solution. These instantaneous flow variations occur when the piston of each piston pump reaches the end of its stroke and moves in the opposite direction, i.e., a momentary pause is produced as the piston reverses direction and the resulting output flow can be somewhat uneven or pulsed. As mentioned above, it is important to carefully control the mass ratio of supercritical fluid and liquid coating composition which form the coating material solution, and such flow variations caused by the piston pumps which supply the two components may lead to the production of a solution having less than the optimum ratio. Additionally, such flow variations can result in the addition of too much supercritical carbon dioxide to the solution and cause it to transition from single phase to two phase. For some types of liquid coating compositions, the presence of a second phase in the solution adversely affects the application characteristics of the solution, while in others the presence of a second phase is desirable.

One suggestion for more accurately controlling the supply of liquid coating composition and supercritical fluid to the system has been to employ metering gear pumps as a replacement for piston pumps. Metering gear pumps are highly accurate and produce a continuous, even output flow which can be controlled to the extent required to ensure that the coating material solution contains the proper ratio of liquid coating composition and supercritical fluid. The problem with metering gear pumps, however, is that they are susceptible to damage and wear by the polymeric and pigmentary solids contained in the liquid coating composition. It has been found that the gear teeth of metering gear pumps become relatively quickly worn by the solids content of the liquid coating composition, requiring variation in pump speed to achieve the same flow up to the point where the pumps become too worn out to operate and must be replaced.

Finally, systems of the type disclosed in the Lee U.S. Pat. No. 4,923,720 for metering a ratio of material into the application system assume that the supercritical fluid diluent is mixed evenly throughout the system and does not leak from the system. It has been found that the supercritical fluids, having a density significantly lower than the liquid coating compositions, tend to separate out into crevices within the system. Pressure and temperature changes, particularly during start-up and shut-down, can cause these trapped bubbles to flow back into the main loop, resulting in a non-steady dispensing pattern since the ratio between the liquid coating composition and supercritical fluid has been changed. In addition, it has been found that the flexible hoses required to convey the coating to the coating dispenser are typically constructed of a polymeric material that is relatively permeable to the supercritical fluid diluent. Thus, the diluent can escape from the system, resulting in an improper content of diluent which is nowhere detected or corrected for in the system. These problems result from the fact that the system has no ability to monitor the supercritical fluid content of the composition while it is in the loop.

SUMMARY OF THE INVENTION

It is therefore among the objectives of this invention to provide an apparatus for forming and dispensing a liquid coating material formulation including a liquid coating composition and a supercritical fluid as a diluent, which accurately maintains the relative proportion of liquid coating composition and supercritical fluid, which maintains the formulation in substantially single phase or in substantially multiphase as desired, and which reduces the frequency and cost of maintenance of the system.

These objectives are accomplished in an apparatus for forming and dispensing a liquid coating material formulation or solution containing a liquid coating composition and a supercritical fluid as a fluid diluent which comprises means for supplying the liquid coating composition, means for supplying the fluid diluent, means for combining the two components to form the coating material solution or formulation, and a control system for (1) monitoring a parameter of the formulation which can be correlated to either the fluid diluent content or the liquid coating composition content of the formulation, and (2) monitoring the pressure of the formulation at selected locations within the system. The control system is effective to adjust the supply of fluid diluent in accordance with variations in the sensed parameter, and to adjust the supply of liquid coating composition in response to pressure changes within the system, to maintain the coating material formulation in substantially single phase or in substantially multiple phase as desired, and to ensure that the desired ratio of liquid coating composition to fluid diluent is obtained before the formulation is supplied to coating dispensers for deposition onto a substrate. Alternatively, the control system is capable of varying the supply of fluid diluent in response to pressure changes within the system, and to vary the supply of the coating formulation in accordance with variations in the sensed parameter.

In the presently preferred embodiment, the coating composition and the fluid diluent are each supplied to the system by separate, independently controlled piston pumps. While piston pumps are rugged in construction, easy to maintain and suitable for use with coating compositions having a high content of pigments and sedimentary materials, piston pumps inherently produce a pulsed output flow which can adversely affect the ratio of coating material to fluid diluent within the coating material formulation, as described above. This problem of pulsed or instantaneously uneven output flow from the piston pumps is overcome in the apparatus of this invention by the control system herein which monitors the coating material formulation being produced and operates a control valve associated with the source of fluid diluent to accurately control the quantity of supercritical fluid introduced into the system.

The control system of the presently preferred embodiment includes a capacitor located downstream from the mixer wherein the liquid coating composition and fluid diluent are combined to form the coating material solution or formulation. The capacitor can take the form of two spaced plates, or an electrode concentrically mounted within a flow passageway formed in the capacitor. It has been discovered that the dielectric constant of the solution varies as a function of its fluid diluent content. The capacitor of either embodiment is effective to sense variations in the capacitance or dielectric constant of the solution and forms part of a capacitance bridge, or capacitance sensing circuit, which produces a voltage output corresponding to the sensed capacitance. This voltage output is accepted as an input to a computer, such as a personal computer, which employs a Proportional Integral Derivative algorithm, hereinafter referred to as a PID loop. The output of the PID loop is input from the computer to a pulse generator circuit which governs the duty cycle of a control valve connected between a tank of liquefied gas and the mixer. Depending upon the capacitance of the coating material formulation which is sensed by the capacitor, the control valve is operated by the computer and pulse generator circuit to adjust the flow of liquified gas into the system for conversion to a supercritical fluid diluent and mixture with the coating composition flowing therethrough.

The application characteristics of some types of liquid coating compositions are optimized if such compositions are dispensed in a "single phase" solution, whereas other liquid coating compositions are preferably dispensed in a "two phase" solution, or possibly other multiple phase solution, to obtain optimum application characteristics.

In one presently preferred embodiment of this invention, the control system initially performs a calibrating procedure in which the system operator intermixes various proportions of fluid diluent and liquid coating composition until he or she is satisfied with the spray pattern being produced from the dispenser of the system. When the optimum application characteristics have been obtained, the capacitor output is recorded as a reference point or set point in the computer associated with the control system. During operation of the apparatus, the control system monitors the capacitor output, as described above, and compares it to the set point. As described in detail below, the control system is operative to control the operation of the valve associated with the supply of fluid diluent and/or liquid coating composition to appropriately vary the flow of either component into the system loop if any variation from the calibrated set point of the fluid diluent, and/or liquid coating composition, is sensed.

This general procedure is utilized in different embodiments of this invention to maintain a coating material formulation with a desired ratio of fluid diluent to coating composition which may produce either a single phase or multiple phase solution.

With respect in particular to multiple phase solutions, it has been found that the characteristic voltage output from the capacitance bridge, or capacitance sensing circuit, can under some conditions produce a relatively widely fluctuating signal. It is believed that this widely fluctuating signal is attributable to the formation of bubbles, or other forms of the dispersed phase, within the continuous phase of the coating material formulation which are larger in size than the spacing between the plates of the capacitor through which the formulation is directed for monitoring purposes. Because the capacitance of a second phase dispersed bubble, which will typically be a supercritical fluid rich bubble, is greatly different from that of the continuous phase which is the resin rich phase, the voltage output from the capacitance sensing circuit can widely vary or spike where the capacitor alternately senses the capacitance of the large second phase bubbles passing between the capacitor plates, and then the first phase, resin rich portion of the coating material formulation.

In one presently preferred embodiment of this invention, this problem is addressed by replacing the mixer of the system with a filter having a mesh size which is smaller than the spacing between the plates of the capacitor. The filter is effective to intermix the fluid diluent and liquid coating composition, and also to reduce the size of the bubbles, or other dispersed phase forms which are present within the formulation, to a size which is less than the spacing between the plates of the capacitor. It has been observed that this type of filter is effective to reduce or eliminate the widely fluctuating output signal from the capacitance sensing circuit, and thus the accuracy of the capacitance readings of the coating material formulation is improved which permits better control of the system operation.

In another embodiment of the invention, this problem is addressed by inputting the widely fluctuating output into a variability determining means such as a standard deviation routine. The system is then calibrated using the standard deviation of the output obtained under optimum spraying conditions as the set point. During operation, the standard deviation of the actual output is compared to this standard deviation set point to permit reproduction of the desired spraying conditions.

Another refinement or improvement of the basic control system of this invention described above involves taking into account the capacitance of the virgin liquid coating composition being introduced into the loop of the system. It has been recognized that the capacitance of a given type virgin liquid coating composition can vary appreciably from batch to batch, and even within the same container during the course of a production run due to thermal effects and other variables. As described above, the initial calibration procedure conducted in the basic embodiments of this invention obtain an optimum set point for the capacitance of the liquid coating composition against which future capacitance measurements are compared during operation of the system. But this procedure assumes that the capacitance of the virgin liquid coating composition remains the same throughout system operation. If the capacitance of the virgin liquid coating composition changes, the set point determined during the calibration procedure is no longer an accurate reference point for comparison with capacitance measurements of the formulation.

Additional embodiments of this invention address this problem of changing capacitance of the virgin liquid coating composition. In one presently preferred embodiment, a second capacitor is placed in the supply line for the liquid coating composition at a location upstream from the circulation loop. The output generated from this second capacitor is representative of the capacitance of the virgin liquid coating composition. As described in detail below, the output from this second capacitor can be used to obtain a more accurate and reliable set point at the beginning of a production run. Alternatively, the capacitance of the virgin liquid coating composition can be continually compared with that of the solution formed in the loop so that the capacitance signal input to the computer which controls the flow of fluid diluent or liquid coating composition into the loop is automatically adjusted to account for variations in the capacitance of the virgin liquid coating composition.

In one presently preferred embodiment, the source of coating composition and the source of fluid diluent are combined in a recirculating loop. In an alternative embodiment, these fluids are combined in a large, high pressure, mixing tank. However, the cost of construction of such a vessel is relatively high, and adequate means for completely mixing the compositions within such a vessel is not as reliable as the static mixers employed in the recirculating loop. In this alternative embodiment, the fluid diluent is pumped into the tank through one control valve and the liquid coating composition is pumped into the tank through the other control valve. A pressure sensor in the tank controls the addition of liquid coating composition to the tank. A capacitance sensor, for example, is installed in a fluid line between the tank and the spray gun to control the addition of fluid diluent through the tank to the control valve.

In one preferred embodiment disclosed herein the flow within the recirculating loop is provided by a high pressure, piston circulation pump. The outlet of the pump flows through the static mixers and the capacitor to one or more coating dispensers. The supply of fluid diluent feeds the recirculating loop between the pump outlet and the static mixers. The capacity of the pump is significantly higher than the maximum dispense rate, so a portion of the material returns from the dispenser to a back pressure regulator located in a return section of the recirculating loop. This pressure regulator holds the pressure at the dispenser at a substantially constant level of about 1600 to 1700 psi. Thus, the pump is required to generate about 1700 psi to supply the dispenser. A first pressure transducer monitors this pressure.

The back pressure regulator opens or closes to maintain the upstream pressure (at the dispense head). Thus, the pressure in the downstream, return section of the recirculating loop varies depending on the amount of material in the loop and the flow rate provided by the circulation pump. Additional pressure variation is caused by the intermittent stroking of the circulation pump. An accumulator with a gas charged piston is provided to minimize pressure fluctuations due to flow rate and pump stroking. Thus, the primary changes in pressure are a result of changes in volume of fluid in the accumulator. A second pressure transducer monitors the pressure in this return section of the recirculating loop. A source of coating composition is provided in this return section of the loop to compensate for these changes in pressure, and corresponding volume of material in the loop.

In the currently preferred embodiment, a computer monitors the second transducer and opens a valve admitting coating composition from the supply source when the pressure falls below a preset lower pressure limit of, for example, 1350 psi. The computer closes this valve when the pressure in the loop between the circulating pump and pressure regulator exceeds an upper limit of about 1400 psi. A properly sized and adjusted accumulator and sufficient "deadband" between these upper and lower limits act to limit the cycle rate of this valve, preventing excessive wear. Alternately, this pressure could be adjusted by a fluid regulator on the composition supply means or other means commonly known to those skilled in the art. The lower pressure limit is chosen so that most of the fluid diluent stays in solution in this return section of the loop.

Since the circulation pump is a pressure driven device, a minimum pressure differential must be present from the input to the output to insure adequate circulation in the loop. If adequate circulation is not present, the fluid diluent will not be mixed well, and will build up near the supply means without being detected at the capacitor.

Although no coating composition is added if the pressure in the downstream leg exceeds the upper limit of about 1400 psi, additional fluid diluent is likely to be added to bring recently added coating composition to the correct ratio. This will cause the pressure in the low pressure leg to rise above the limit of 1400 psi. Thus, another function of the computer is to compare the first pressure transducer and the second transducer. If this difference falls below a preset value of about 200 psi, the computer shuts off the valve admitting the fluid diluent until the pressure drops (typically because material is dispensed).

Another feature of this apparatus is that the volumes and flow path in the loop are designed to insure a uniform mixture at the coating dispenser. Thus, the volume from the fluid diluent supply means to the sensing means is much less than the volume from the sensing means to the dispenser. This allows any errors made during the time it takes newly injected fluid diluent to reach the sensing means to be averaged out by the flow velocity profile in the conduit from the sensing means to the dispenser. Additionally, a bypass line is provided upstream of the dispensers which is set to receive about 25% of the flow of the coating material formulation. This bypass flow is continuously recirculated within the system to help maintain the formulation at an even temperature and to break up any pockets or concentrations of fluid diluent within the system.

DESCRIPTION OF THE DRAWINGS

The structure, operation and advantages of the presently preferred embodiment of this invention will become further apparent upon consideration of the following description, taken in conjunction with the accompanying drawings, wherein:

FIG. 2 is a plan, cross sectional view of the capacitor shown in FIG. 1;

FIG. 3 is a cross sectional, elevational view of the capacitor shown in FIG. 2;

FIG. 13 is a schematic diagram of a circuit for use with an embodiment of the type shown in FIG. 11;

FIG. 13A is a schematic view of the components of the signal produced by the secondary coil of the transformer in the circuit of FIG. 13;

FIG. 13B is a schematic view of a square wave produced by a sine wave/square wave generator;

FIG. 13C is a schematic view of a waveform designated $I_{C2}$ which is an inversion of the waveform $I_{C1}$ of FIG. 13A;

FIG. 13D is a schematic view of the $I_{R2}$ waveform;

FIG. 13E is a schematic view of the summation of waveforms $I_{C2}$ and $I_{R2}$; and FIG. 14 is a view similar to FIG. 13 of an alternative circuit for use with the embodiment of FIG. 11.

DETAILED DESCRIPTION OF THE INVENTION

Figure 1:
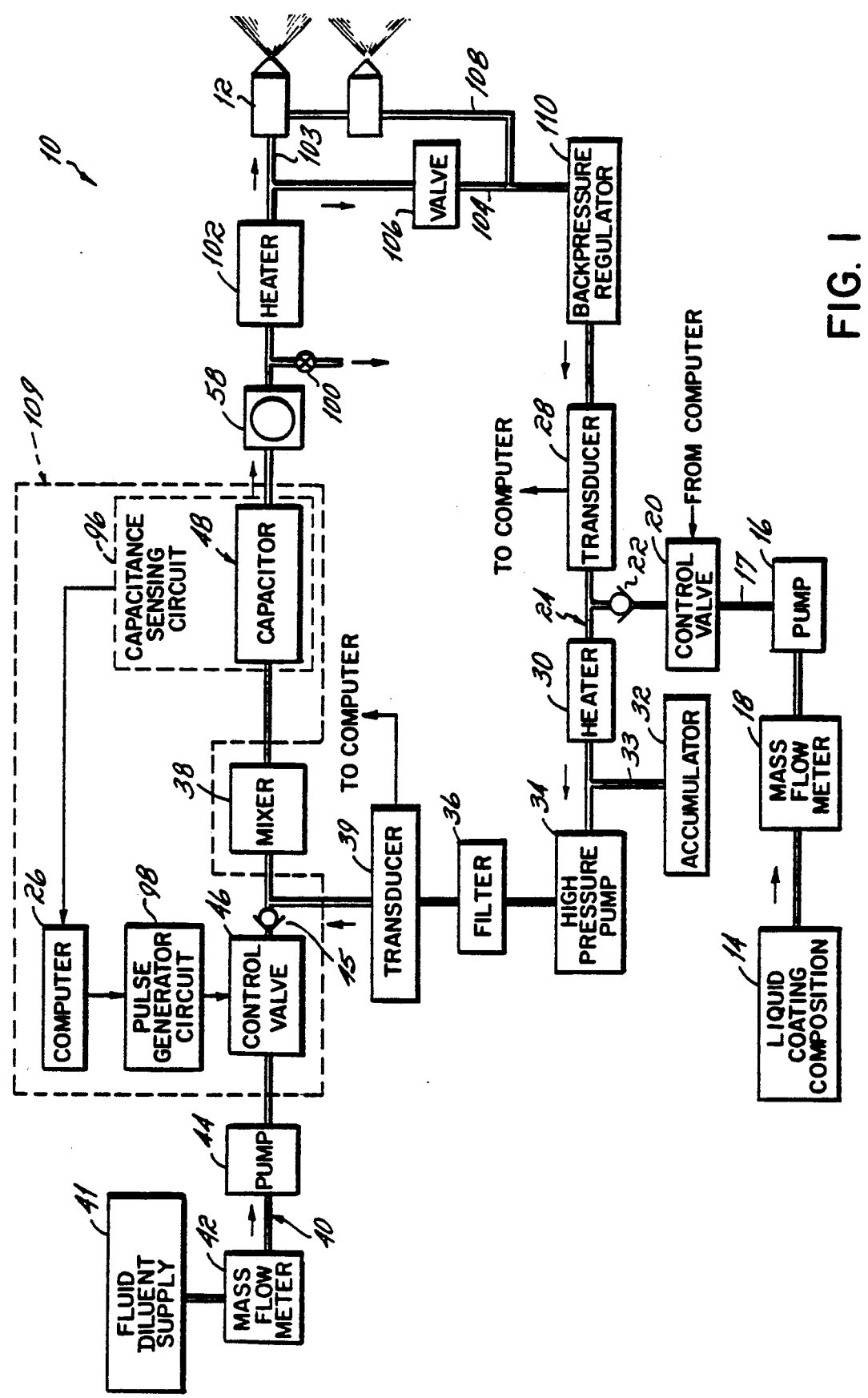
FIG. 1 is a schematic, block diagram of one embodiment of the apparatus of this invention.

Various embodiments of this invention illustrated in the Figs. are specifically intended to form a coating material solution or formulation in which a liquid coating composition and a supercritical fluid are intermixed in a controlled manner to form a liquid coating material solution or formulation which is transmitted to one or more coating dispensers 12 for deposition onto a substrate (not shown). For purposes of the present discussion, the term "liquid coating composition" refers to materials such as paints, wax based materials such as mold release agents, adhesives and other materials which include one or more components to be sprayed, applied or dispersed and a solvent component, where a portion of the solvent component is being replaced with a fluid diluent such as supercritical fluid to reduce solvent emissions. The term "supercritical fluid" as used herein is intended to refer to a gas in a supercritical state above its critical pressure and critical temperature wherein the gas has a density approaching that of a liquid material. It is also contemplated that liquified gases could be utilized in forming the liquid coating material formulation, and it should therefore be understood that the term "liquified gas" may be substituted for the term "supercritical fluid" in the foregoing description. The term "fluid diluent" as used herein is meant to refer interchangeably to supercritical fluids and liquified gases. The terms "coating material solution" and/or "coating material formulation" are used synonymously to refer to the combination of the fluid diluent and liquid coating composition wherein the fluid diluent is substantially dissolved in the liquid coating composition to form a solution, or at least an emulsion or dispersion.

A "coating dispenser" as used herein will, in painting applications at least, normally be an airless-type spray gun capable of handling the fluid pressures used in this system. Preferably, the dispensers are airless spray guns of the type disclosed in co-pending U.S. patent application Ser. No. 07/416,855, entitled "Method and Apparatus For Spraying A Liquid Coating Containing Supercritical Fluid or Liquified Gas" filed on Oct. 4, 1989, which is hereby incorporated by reference in its entirety herein. Alternatively, air-assisted airless-type spray guns could be used such as are shown in U.S. Pat. No. 3,843,052 to Cowan. Air-assisted airless spray guns may have the advantage of including auxiliary air jets which could be used to shape or confine the spray pattern which is typically wider than normal airless spray patterns due to the flashing off of the supercritical fluid as it goes to ambient pressure and temperature upon exiting the spray nozzle.

The purpose of the supercritical fluid and/or liquified gas is to act as a fluid diluent for the coating composition so that the proportion or percentage of organic solvents in the liquid coating composition can be reduced, e.g., by about two-thirds, compared, for example, to most commercially available high solids liquid coating compositions such as paint. A number of compounds in a supercritical or liquified state can be intermixed with a liquid coating composition, such as paint, to produce the coating material solution or formulation obtained by the apparatus of this invention. These compounds include carbon dioxide, ammonia, water, nitrogen oxide ($N_2O$), methane, ethane, ethylene, propane, pentane, methanol, ethanol, isopropynol, isobutanol, chlorotrifluoromethane, monofluoromethane and others. For purposes of the present discussion, supercritical carbon dioxide is employed because of its non-toxic nature and because its critical temperature and critical pressure of 85° F. and 1070 psi, respectively, are well within the operating ranges of standard airless spraying systems including the apparatus 10 of this invention.

The overall construction of the apparatus 10 is first discussed below, followed by a description of its operation with different types of liquid coating compositions.

CONSTRUCTION OF PREFERRED CIRCULATION LOOP AND CAPACITANCE CELLS OF FIGS. 1-3 AND 7

Referring to FIG. 1, one presently preferred embodiment of apparatus 10 is illustrated. The liquid coating composition is drawn from a tank 14 by a pump 16 through a mass flow meter 18 which is preferably a Model HPM 15 mass flow meter sold by the AW Company of Racine, Wisc. The pump 16 can be any suitable piston pump, such as a Model 64B pump sold by Nordson Corporation of Amherst, Ohio, which is capable of pressurizing the liquid coating composition to a pressure of at least about 1350 to 1400 psi, as described below.

The liquid coating composition is discharged from pump 16 into an input line 17, carrying a control valve 20 and a check valve 22, and this input line 17 intersects a main circulation line 24 of the apparatus 10. The control valve 20 is preferably of the type sold under Model No. 912A-PM-11CA by Whitey Company of Highland Heights, Ohio, and is operatively connected to a computer 26, such as an IBM PC Model AT or any other comparable personal computer. The pressure of the material flowing in the circulation line 24 in the area of the intersection of input line 17 and circulation line 24 is monitored by a pressure transducer 28 carried within the circulation line 24. The pressure transducer 28 provides an output to computer 26 corresponding to the sensed pressure thereat, for purposes to become apparent below. The pressure transducer is preferably of the type such as Model No. 246341 sold by Omega Engineering, Inc., of Stamford, Conn.

Moving in the direction of flow within the circulation line 24, i.e., clockwise as viewed in FIG. 1, a heater 30 is located in the circulation line 24 downstream from the pump 16 which is preferably of the type sold under Model No. NH4 by Nordson Corporation of Amherst, Ohio. An accumulator 32 of the type sold under Model No. BD05A214 by Parker Hannifin Corp., of Hillsborough, N.C. is carried in a branch line 33 connected to circulation line 24. The branch line 33 and accumulator 32 are located between the heater 30 and a high pressure, piston pump 34 such as a Nordson Model HP pump, made by Nordson Corporation of Amherst, Ohio. The high pressure pump 34 increases the pressure of the formulation and discharges it through a filter 36 to a static mixer 38. The filter 36 is preferably a Part No. 161510 filter, sold by Nordson Corporation of Amherst, Ohio or a suitable equivalent, which is capable of filtering impurities having a transverse dimension of about 0.02 inches or higher. The static mixer 38 is a TAH Series 100 helical static mixer sold by TAH Industries, Inc. of Inlaystown, N.J., or another suitable commercially available static mixer. Preferably, the mixer 38 includes two parallel paths, one having eighteen mixing elements within a $\frac{3}{8}$ inch NPT mixing pipe and the other having twelve mixing elements within a $\frac{1}{4}$ inch NPT mixing pipe. These two flows are then joined together within a single $\frac{1}{4}$ inch NPT mixing pipe which is discharged from the mixer 38. A pressure transducer 39, identical to transducer 28, is located in circulation line 24 downstream from filter 36 to sense the output pressure of high pressure pump 34, for purposes to become apparent below.

In the embodiment of apparatus 10 illustrated in FIG. 1, the circulation line 24 is intersected by a supply line 40 at a point upstream from the mixer 38 and downstream from where the liquid coating composition enters the circulation line 24. This supply line 40 receives fluid diluent, e.g., liquified carbon dioxide, at a pressure of about 800 psi and temperature of about 75° F. (ambient) from a metal cylinder or tank 41. The liquified carbon dioxide is directed through supply line 40 to a mass flow meter 42, preferably a Model D-S006S100 mass flow meter manufactured by Micro Motion Company of Boulder, Colo. After passing through the mass flow meter 42, the liquified carbon dioxide is directed to a pump 44 which increases the pressure of the liquified carbon dioxide to about 2000 psi, i.e., well above the 1070 psi critical pressure needed to form supercritical carbon dioxide. Preferably, the pump 44 is a Haskell pump Model DSF35 sold by the Haskell Company of Burbank, Calif. The liquified carbon dioxide is discharged from the pump 44 through a check valve 45 and a control valve 46 carried by supply line 40 whose operation is controlled by the computer 26 as described in detail below. Preferably, the control valve 46 is a Model No. SSHB54 manufactured by Whitey Company of Highland Heights, Ohio.

In the embodiment of FIG. 1, the liquified carbon dioxide is introduced from supply line 40 into the loop or circulation line 24. Although the pressure of the liquified carbon dioxide is increased to above the critical pressure of supercritical carbon dioxide by pump 44, its temperature is maintained at about 75° F. which is below the 85° F. critical temperature. In order to form a coating material formulation consisting of liquid coating composition and supercritical carbon dioxide, the temperature of the liquified carbon dioxide introduced into circulation line 24 must be increased to above 85° F. This is accomplished by heater 30 and heater 102, described below, which combine to maintain the coating material formulation within line 24 at a temperature in the range of about 120° F. to 130° F. Shortly after the liquified carbon dioxide enters the line 24, it is heated above the critical temperature of 85° F. and forms supercritical carbon dioxide which is combined with the liquid coating composition within mixer 38 to form the coating material formulation as described below.

Figure 1A:
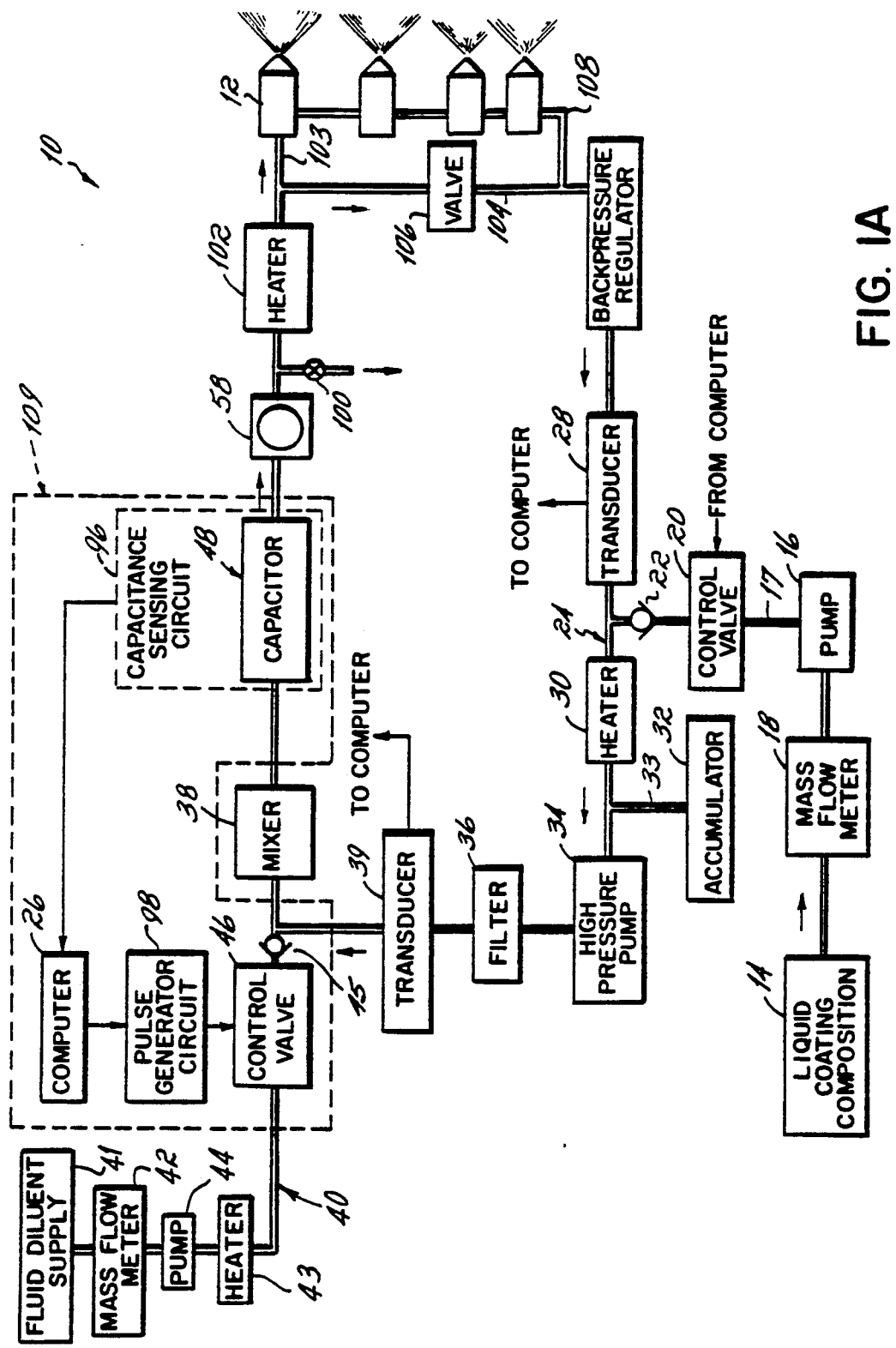
FIG. 1A is a diagram similar to FIG. 1 of an alternative embodiment herein.

An alternative embodiment of apparatus 10 is illustrated in FIG. 1A which is identical to that shown in FIG. 1 except for the state at which "fluid diluent" is introduced into the circulation line 24. The FIG. 1A embodiment is intended for relatively high volume flow, and therefore a total of four coating dispensers 12 are illustrated whereas only two coating dispensers 12 are shown in FIG. 1. Because of a higher volume of flow, it is contemplated that the introduction of comparatively large quantities of cooler (ambient temperature) liquified carbon dioxide might result in a reduction of the temperature of the coating material formulation within circulation line 24, e.g., on the order of 10° F. to 15° F. from the normal temperature of about 120° F. to 130° F., which could result in a failure to maintain the coating material formulation in the desired temperature range for spraying prior to discharge from dispensers 12 which could result in poor atomization. That is, heater 102 positioned between supply line 40 and dispensers 12 may not be capable of compensating for the temperature drop caused by the introduction of large quantities of liquified carbon dioxide into line 24.

In order to avoid this potential problem, the embodiment of FIG. 1A includes a third heater 43 positioned in the supply line 40 between the pump 44 and the control valve 46. This heater is preferably a Model NH4 heater sold by Nordson Corporation of Westlake, Ohio. Liquified carbon dioxide is directed through mass flow meter 42 and pump 44 as in FIG. 1, but then heater 43 increases its temperature to about 130° F. which is well above the 85° F. critical temperature of supercritical carbon dioxide. Because the pump 44 increases the pressure of the liquified carbon dioxide to about 2000 psi, the liquified carbon dioxide is converted to the supercritical state after flowing through heater 43 and is introduced in that state into the circulation line 24. The embodiment of FIG. 1A therefore substantially avoids the problem of temperature drop within the line 24, and is particularly useful in relatively high volume applications.

In either of the embodiments of FIGS. 1 and 1A, the coating material solution or formulation is discharged from the mixer 38 through circulation line 24 into a capacitor 48. In one presently preferred embodiment illustrated in FIGS. 2 and 3, the capacitor 48 comprises a pair of end plates 50 and 52 formed with stepped throughbores 54, 56, respectively, which connect to the circulation line 24. The end plates 50, 52 are mounted on either side of a capacitor block 60 including an outer sleeve 62 formed with an internal bore 64 within which the end plates 50, 52 partially extend. The sleeve 62 mounts a cylindrical, electrically insulative mounting block 66 within its internal bore 64, and this mounting block 66 is formed with a stepped bore having an inlet 70, an outlet 72 and a cavity 74 therebetween. The cavity 74 of mounting block 66 receives a pair of capacitor plates 76 and 78 which are held in place by keys 80. Preferably, the capacitor plates 76, 78 are each one-inch diameter stainless steel plates which are separated within the cavity 74 of mounting block 66 by a gap or space 82 of about 0.02 inch. As mentioned above, the filter 36 is capable of filtering impurities from the solution of 0.02 inches or greater, which avoids clogging or blockage of the space 82 between the plates 76, 78. As viewed in FIG. 2, the space 82 between capacitor plates 76, 78 aligns with the inlet 70 and outlet 72 of the stepped bores 54, 56 in end plates 50, 52, respectively, thus forming a flow path for the coating material formulation through the capacitor 48.

An electrical lead 88 encased in an insulative connector is mounted within a threaded bore 90 formed in sleeve 62 and extends into electrical contact with the capacitor plate 76. Similarly, a second electrical lead 92 is mounted within a threaded bore 94 formed within the outer sleeve 62 opposite bore 90, and this electrical lead 92 extends into electrical contact with the second capacitor plate 78. As described in detail below, in the course of movement of the coating material solution through the gap 82 between the capacitor plates 76, 78, the capacitor 48 is effective to sense the capacitance, or dielectric constant, of the coating material solution, either of which can be correlated to the content of fluid diluent, e.g., supercritical carbon dioxide, therein. The capacitor 48 forms part of an electrical circuit such as a capacitance bridge or capacitance sensing circuit 96, for example, which produces an output dependent on the sensed capacitance, and this output is accepted as an input by the computer 26. See FIG. 1. The computer 26, in turn, drives a pulse generator circuit 98 which controls the duty cycle of control valve 46 associated with the supply of fluid diluent.

Figure 7:
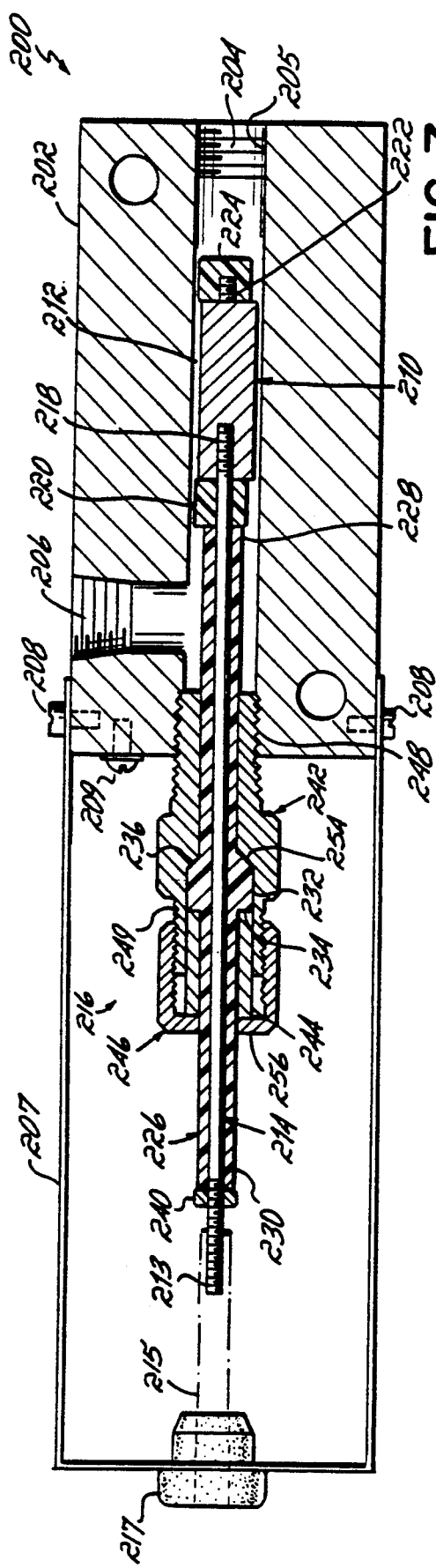
FIG. 7 is a cross sectional view of an alternative embodiment of the capacitor employed in the control system of this invention.

Referring now to FIG. 7, an alternative embodiment of a capacitor 200 is illustrated, which, if desired, can be used as a replacement for capacitor 48. The capacitor 200 comprises a capacitor block 202 formed with a throughbore 204 defining a wall 205 which is intersected by an inlet passage 206 adapted to connect to the circulation line 24. The throughbore 204 and inlet passage 206 define a flow passage for transmitting the coating material formulation through the capacitor 200 and downstream into line 24. Preferably, one end of the capacitor block 202 is enclosed by a cover plate 207 connected thereto by screws 208, and the capacitor block 202 is grounded by a wire (not shown) connected to a ground screw 209.

The capacitor 200 includes structure for mounting a cylindrical electrode 210 within the interior of throughbore 204 at a selected, predetermined spacing or gap 212 from the block wall 205. This mounting structure includes the following components. A rod 214 carried by a connector assembly 216 extends into the throughbore 204 and has a threaded end 218 which is received within a threaded bore in the cylindrical electrode 210 providing an electrical connection therebetween. The threaded outer end 213 of rod 214 is connected to an electrical lead 215, shown in phantom in FIG. 7, which is carried by a connector 217 mounted to the cover plate 207. A bushing 220, formed of nylon or other dielectric material, is carried by the rod 214 and abuts one side of the cylindrical electrode 210. The opposite side of the cylindrical electrode 210 has a threaded stub 222 which mounts an electrode support 224 preferably in the form of a plastic, spider-shaped ring.

The connector assembly 216 is shown on the lefthand side of FIG. 7. This assembly comprises a sleeve 226, preferably formed of a plastic material, having a throughbore which receives the rod 214, an inner end 228, an outer end 230 and a radially outwardly extending flange 232 having a seat 234 and tapered shoulder 236. As used herein, the term "inner" is used to refer to a direction toward the righthand side of FIG. 7, and "outer" refers to the opposite direction. The threaded outer end 213 of rod 214 receives a nut 240 which is tightened against the outer end 230 of sleeve 226 to pull the bushing 220 and electrode 210 toward inner end 228 of sleeve 226 so that the bushing 220 and electrode 210 are held in compression and in abutment with the sleeve 226.

The sleeve 226 is retained on the capacitor block 202 by a fitting 242, spacer 244 and lock nut 246. The fitting 242 has a threaded, inner end 248 which mates with threads formed in the block wall 205 at one end of the throughbore 204. In addition, the fitting 242 has a stepped throughbore which includes an annular, tapered surface 254. The sleeve 226 is insertable within the stepped throughbore 252 of fitting 242 such that the tapered shoulder 236 of sleeve 226 is located adjacent the correspondingly shaped tapered surface 254 of the stepped throughbore in fitting 242.

The sleeve 226 and fitting 242 are connected together by the spacer 244 and lock nut 246. The spacer 244 is a tubular ring which rests on the outer surface of sleeve 226 in abutment with the seat 234 of flange 232, and extends into the stepped throughbore of fitting 242 along its outer end 249. This outer end 249 of fitting 242 is externally threaded and is adapted to engage the internal threads of lock nut 246. The lock nut 246 has an outer flange 256 which, upon rotation of the lock nut 246, engages the spacer 244 urging it against the seat 234 in flange 232 of sleeve 226. In turn, the sleeve 226 is urged inwardly, i.e., to the right as viewed in FIG. 7, so that its tapered shoulder 236 engages the tapered surface 254 of the stepped throughbore 252 in fitting 242. This securely interconnects the sleeve 226 and fitting 242 to provide a fluid-tight seal therebetween.

It has been found that the aforementioned construction of capacitor 200 is advantageous in a number of respects. The mounting structure for the cylindrical electrode 210 enables the gap 212 between the electrode 210 and block wall 205 to be maintained within a relatively close tolerance regardless of changes in temperature and pressure. As a result, an accurate capacitance reading can be obtained as the coating material formulation flows through the throughbore 204 and the gap 212. Additionally, no O-rings are required with the elements used to construct capacitor 200 and this adds to the longevity of capacitor 200. It has been found that the coating material formulation, and particularly the supercritical carbon dioxide, tends to degrade the material normally used to construct compressive O-rings upon contact therewith which can lead to undesirable leakage of the system and structural instability. The elimination of O-rings in capacitor 200 is therefore advantageous in this application. The relatively large surface area between the internal cylindrical plate and the external tubular plate of capacitor 200 provides a stronger more reliable signal than previously used flat plate capacitors which results in better system control.

Downstream from the capacitor 48 is a sight glass 58 which can be used to provide a visual indication of whether the solution is in single phase, i.e., whether or not bubbles, or other forms, of a second phase are being formed within the solution. A dump valve 100 and a second heater 102 are located between the sight glass 58 and the coating dispensers 12 which are connected by a discharge line 103 to the circulation line 24. In the presently preferred embodiment, a bypass line 104 having a valve 106 is located between the second heater 102 and coating dispensers 12 to receive at least part of the flow of coating material solution which would otherwise be transmitted through discharge line 103 to the coating dispensers 12. Preferably, the valve 106 is set so that about 25% of the flow of solution bypasses the coating dispensers 12 and enters bypass line 104. A recirculation line 108 extends from the coating dispensers 12 to a back pressure regulator 110 which is located in circulation line 24 immediately upstream from the pressure transducer 28 described above. The recirculation line 108 receives solution from the coating dispensers 12 when they are shut off or operated intermittently.

The foregoing discussion of apparatus 10 describes the various components employed in this invention for combining a fluid diluent such as supercritical carbon dioxide, and a liquid coating composition, to form a coating material formulation. In the description which follows, alternative embodiments of this invention are disclosed which are primarily concerned with monitoring and control operations which maintain the desired proportion of fluid diluent, and liquid coating composition, within the formulation. The embodiments herein which base control on utilization of a formulation parameter (e.g., capacitance of the formulation) are first discussed, and then embodiments which base control on utilization of both a formulation parameter and a coating composition parameter (e.g., capacitance) are discussed.

CONTROL BASED ON UTILIZATION OF FORMULATION PARAMETER

Referring now again to FIG. 1, the operation of system 10 is illustrated. Initially, a calibration procedure is undertaken to obtain an optimum ratio or proportion of supercritical carbon dioxide to liquid coating composition which, when dispensed as a solution or formulation from the coating dispenser 12, produces the desired pattern and coverage on a particular substrate. The control valve 20 is opened by computer 26 to permit the introduction of liquid coating composition into the circulation line 24 where it is fed through high pressure pump 34 and filter 36 to the mixer 38. The liquid coating composition fills the loop to a pressure in excess of the critical pressure such as 1100 psi. Then, the control valve 46 is opened by the computer 26 to introduce either liquified carbon dioxide (FIG. 1) or supercritical carbon dioxide (FIG. 1A) into the circulation line 24. In both embodiments of FIGS. 1 and 1A, supercritical carbon dioxide is combined with the liquid coating composition within mixer 38 to form the liquid coating material solution. The solution is discharged from mixer 38 into the capacitor 48 which, as previously noted forms one leg of a capacitance bridge 96, or other capacitance sensing, electrical circuit. Capacitor 48 senses the capacitance of the coating material solution thereby causing capacitance bridge 96 to produce a characteristic output voltage, $V_o$. The voltage $V_o$ is accepted as an input by the computer 26 where it is stored as the calibration procedure continues. When the operator visually determines that the coating material solution being dispensed from the coating dispenser 12 has optimum application characteristics, he or she instructs the computer 26 to record the value of the voltage $V_o$ from capacitance sensing circuit 96, and uses such voltage output as a reference or set point indicative of the optimum percentage or proportion of supercritical carbon dioxide desired within that particular coating material solution.

As mentioned above, the capacitance sensing circuit 96 functions to produce an output dependent on the capacitance of the solution. It has been found through experimentation that the capacitance of the solution can be correlated to the supercritical carbon dioxide content of the solution. For example, a decrease in the capacitance of the solution is obtained with an increase in its supercritical carbon dioxide content, and vice versa. The capacitor 48 thus provides a convenient means for sensing a parameter of the solution which can be correlated to its supercritical carbon dioxide content so that control and adjustment of same can be achieved, as described below, to maintain optimum application characteristics of the solution.

A calibration procedure and a coating operation of apparatus 10 can be performed with the liquid coating composition disclosed at column 11, lines 38–48 of the Lee et al U.S. Pat. No. 4,923,720, the disclosure of which is incorporated by reference in its entirety herein. As set forth therein, 7430 grams of a clear acrylic coating concentrate are prepared by mixing the following materials:

4830 grams of Acryloid TM AT400 Resin (Rohm and Haas Company) which contains 75% non-volatile acrylic polymer dissolved in 25% methyl amyl ketone;

1510 grams of Cymel TM 323 Resin (American Cyanamid Company) which contains 80% non-volatile melamine polymer dissolved in 20% isobutanol solvent;

742 grams of methyl amyl ketone;

348 grams of n-butanol solvent.

A coating composition similar to that described above was used in connection with an experiment conducted with the preferred embodiment of this invention, except that: Rohm & Haas Acryloid TM AT954 was substituted for Acryloid TM AT400 and constituted 70% by weight of the mixture; the same American Cyanamid TM 323 Resin was used and constituted 24% by weight of the mixture; Union Carbide Corporation's UCAR TM ester ethyl 3 ethoxy propionate was substituted for methyl amyl ketone, and n-butyl solvent, and constituted 5.6% by weight of the mixture; and, Union Carbide Corporation's Silwet TM L7605 surfactant was added in an amount comprising 0.4% by weight of the mixture. With this coating composition, optimum application characteristics were obtained with a solution having a supercritical carbon dioxide content of about 30%, and a corresponding capacitance of about 52 picofarads. The percentage of supercritical carbon dioxide is readily calculated by comparing the total flow in grams of liquified carbon dioxide (FIG. 1) or supercritical carbon dioxide (FIG. 1A) through mass flow meter 42 with the total flow in grams of the liquid coating composition through the mass flow meter 18 at the time during the calibration procedure when the operator determines that optimal spraying conditions have been obtained. The measure of the capacitance is determined directly from the output voltage $V_o$ of capacitance sensing circuit 96 which includes capacitor 48.

Figure 4:
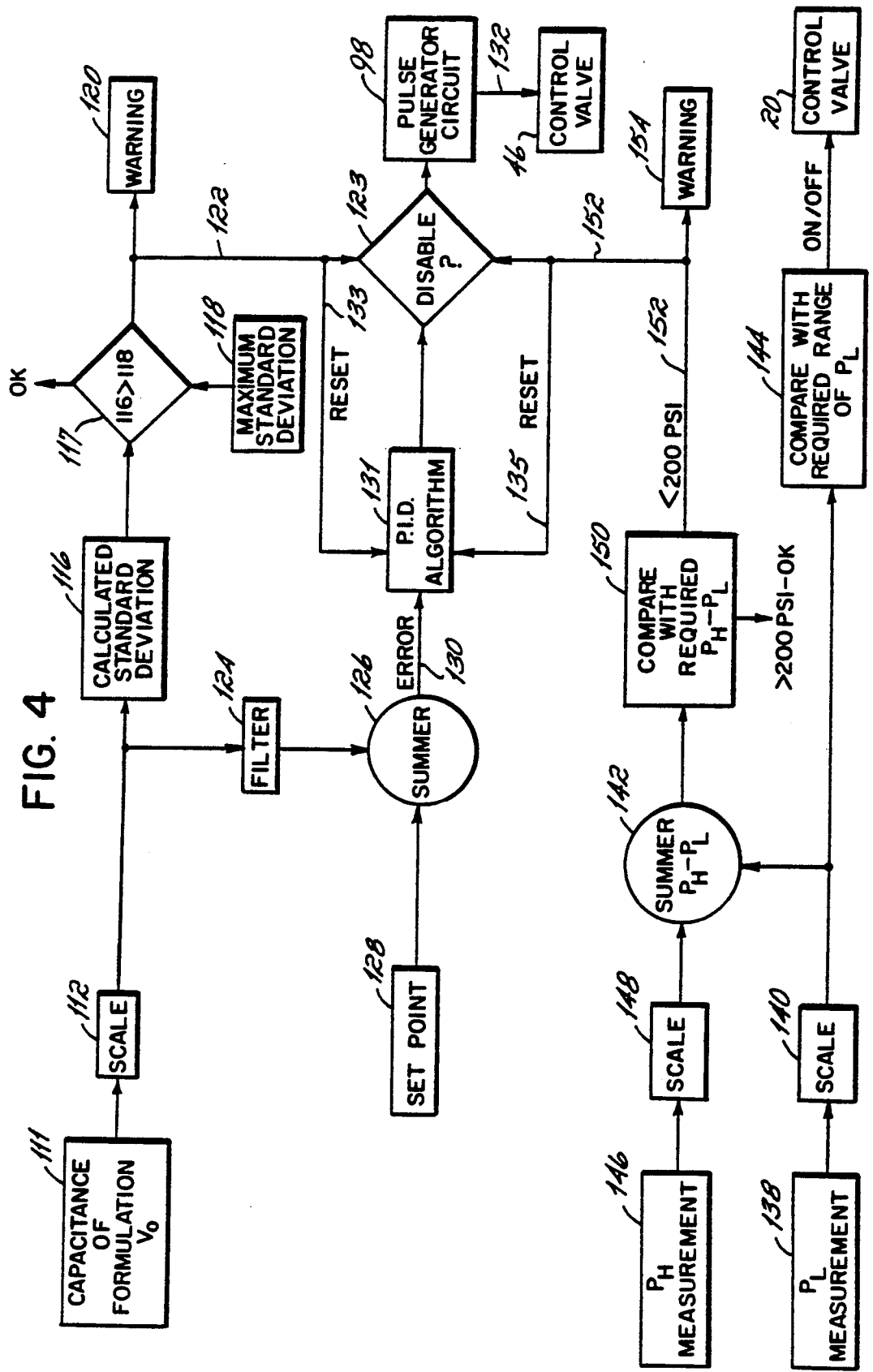
FIG. 4 is a functional block diagram of the operation of the control system of this invention.

FIG. 4 Embodiment For Maintaining Substantially Single Phase Formulation

An important aspect of the operation of apparatus 10 is to maintain control over the supercritical carbon dioxide content of the solution so that the desired spraying conditions obtained during the calibration procedure can be duplicated in production in a closed loop fashion. As noted above, one purpose for maintaining such control is to ensure for some applications that the coating material solution remains substantially in single phase before the solution is delivered to the dispenser. It has been found that in most solutions at some point the addition of more supercritical carbon dioxide eventually causes a second phase to form in the circulation loop which can be undesirable when using some types of liquid coating compositions.

FIG. 4 is a functional block diagram of the operation of capacitor 48, capacitance sensing circuit 96, computer 26, pulse generator circuit 98 and control valve 46 which collectively comprise a control system 109 operative to ensure that the content of supercritical carbon dioxide within the solution is properly controlled. With reference to the top line of blocks illustrated in FIG. 4, functional operations performed by the control system 109 are depicted which ensure that the percentage or proportion of supercritical carbon dioxide does not exceed a maximum amount so that the coating material solution is maintained substantially in single phase.

The voltage output from the capacitance sensing circuit 96, i.e., $V_o$ as depicted at block 111, varies as a function of the changes in capacitance of the solution as sensed by the capacitor 48. This voltage output is accepted as an analog input to the computer 26 which scales the voltage output as represented at block 112 to convert it to an input form which can be utilized by summer 126 in a manner later described to compare it to the input provided by set point 128. The scaled output is passed through a filter 124 (later described) before being input to summer 126. In the presently preferred embodiment, computer 26 samples voltage $V_o$ four times a second. After being scaled at 112, as shown in the top line of blocks of FIG. 4, these $V_o$ measurements are processed in the computer 26 in block 116 to determine the standard deviation of the most recent forty $V_o$ measurements. The standard deviation measurement of $V_o$ is relevant because as second phase bubbles form in the solution, the capacitance signal $V_o$ becomes highly variable. The greater the number and size of second phase bubbles, the more highly variable the output becomes. Likewise, the greater the variability of the output the larger its standard deviation.

As represented by comparator 117, this calculated or actual standard deviation is then compared by the computer 26 with a predetermined maximum standard deviation, represented by block 118, which corresponds to an unacceptable degree of two phase material. In the presently preferred embodiment, an actual standard deviation in excess of the 0.15 maximum standard deviation produces a signal 122 which initiates a warning as indicated at block 120 that the formulation is no longer in substantially single phase. Signal 122 is also processed by the computer 26 as at block 123 to produce a disable signal. This disable signal is input to the pulse generator circuit 98 which causes the control valve 46 to shut off the supply of liquified carbon dioxide (FIG. 1) or supercritical carbon dioxide (FIG. 1A) into the circulation line 24 to ensure that no additional second phase material is generated. To correct this problem, the operator may have to discharge solution from the loop, allowing the introduction of additional liquid coating composition to return the formulation to a single phase condition. Disable signal 122 is also input to the PID algorithm block 131 (later described) to reset the accumulated error term to zero.

FIG. 4 Embodiment For PID Control Based On A Set Point

A second function of the control system 109 described above is to maintain the supercritical carbon dioxide at the desired, predetermined level indicated by signal $V_o$, e.g., at a volumetric proportion of about 30% of the coating material solution for the particular liquid coating composition mentioned above. It should be understood, however, that different liquid coating compositions may require more or less supercritical carbon dioxide to produce an acceptable coating on a particular substrate.

With reference to the middle portion of FIG. 4, the sampled voltage output $V_o$ from capacitance sensing circuit 96, after having been scaled at block 112, is processed by the computer 26 in a ten point moving average filter function indicated at block 124. That is, the last ten samples of the voltage output $V_o$ from capacitance sensing circuit 96, which correspond to the capacitance of the solution sensed by capacitor 48, are averaged and this average is input to a summer 126. The summer 126 compares the ten point moving average to the set point indicated at 128, i.e., the voltage output obtained from capacitance sensing circuit 96 during the calibration procedure described above to represent the optimal spray conditions. The difference between the actual supercritical carbon dioxide content of the solution represented by the output of filter 124, and the optimum supercritical carbon dioxide content represented by the set point 128, is output from the summer 126 as an error signal 130. This error signal 130 is accepted as an input to a standard PID loop function implemented in software within the computer 26 as represented by block 131 in FIG. 4. The PID loop function executed is a standard proportional, integral, derivative control algorithm of a commercially available type such as LabTech Notebook Version 5.0 available from Laboratory Technologies, Inc. of Wilmington, Mass. Preferably, the PID control algorithm executed by computer 26 has a proportional coefficient of 10, an integral coefficient of 0.1 and a derivative coefficient of 30. Such values are chosen to match the time lags and gains present in the system, and to minimize overshoot, as will be obvious to anyone skilled in the art of tuning control loops. Consequently, these coefficient values will vary depending on the selection of loop electrical and mechanical components.

Absent a disable signal 122 caused by a calculated standard deviation value for $V_o$ in excess of 1.5, representing too great a degree of two phase material in the formulation, and absent a disable signal 152 (later described), the output of the PID loop is passed to the pulse generator circuit 98 which produces an output represented at 132 to the control valve 46. The pulse generator circuit 98 controls the duty cycle of the control valve 46, i.e., the pulse generator circuit 98 repeatedly opens and closes the control valve 46, with the "open time" depending upon the quantity of supercritical carbon dioxide required to obtain the desired proportion within the coating material solution. For example, if the error signal increases, the pulse generator circuit 98 increases the open time of the control valve 46 to return the solution to the desired proportion of liquid coating composition and supercritical carbon dioxide. Conversely, if the error signal decreases, the duty cycle or open time of the control valve 46 is reduced by the pulse generator circuit 98 so that progressively less supercritical carbon dioxide is introduced into the loop until the desired ratio is again obtained to achieve a zero error signal. This is PID control.

Maintenance of System Temperature And Pressure

In addition to controlling the proportion of supercritical carbon dioxide in the coating material solution, the apparatus 10 of this invention includes structure for monitoring and controlling the pressure within circulation line 24, and for adjusting the temperature of the coating material solution. The control of system temperature and pressure are necessary to maintain the carbon dioxide in the supercritical state in solution with the liquid coating composition, and to obtain the desired pressure for atomization of the solution discharged from the coating dispenser 12. Additionally, structure is provided to maintain a substantially constant temperature within circulation line 24.

With respect to temperature control, the coating material solution is directed through two heaters 30 and 102 each having thermostats which are preferably set at about 140° F. The solution leaves such heaters 30, 102 at about 130° F. which ensures that even if a relatively long delivery line 103 is employed (which is typically thermally insulated) between the heater 102 and coating dispenser 12, the solution will nevertheless be supplied to the coating dispenser 12 at a temperature in excess of 85° F. which is the critical temperature necessary to maintain carbon dioxide in supercritical state in the solution.

The maintenance of an appropriate pressure within the apparatus 10 is achieved by the control system 109 of this invention. In the presently preferred embodiment, the transducer 28 measures the pressure of the solution at a location in close proximity to the point at which the coating composition is delivered into the circulation line 24 and upstream from the input side of high pressure pump 34. At the input side of high pressure pump 34, the solution is at its lowest pressure within circulation line 24 and this measurement is represented as a "$P_L$ measurement" at block 138 in FIG. 4. As shown in FIG. 4, the measurement $P_L$ is transmitted to the computer 26 which scales it to pounds per square inch (psi) as represented by block 140. The scaled signal is accepted as an input to a summer 142, as described further below, and as an input to block 144 which is representative of calculations made by computer 26 in which the $P_L$ measurement is compared to a predetermined maximum pressure and minimum pressure which are desired at the input side of circulation pump 34. In the presently preferred embodiment, the computer 26 opens the control valve 20 in the event $P_L$ falls below about 1350 psi, and closes the control valve 20 in the event $P_L$ exceeds about 1400 psi. The pressure in that portion of the circulation line 24 between the back pressure regulator 110 and input side of high pressure pump 34 is thus maintained on the order of about 1350 to 1400 psi.

The purpose of maintaining the pressure at the input side of circulation pump 34 between 1350–1400 is to provide sufficient pressure to the input side of the pump for effective operation, and also to provide a sufficient pressure drop across the pump 34 to prevent it from stalling. Stalling could occur if one or more of the dispensers 12 close and liquid coating material continues to be added to line 24 such that the pressure on the input side of the pump 34 became greater than that on its output side. In the event the high pressure pump 34 stalls, a disproportionately high percentage of liquified carbon dioxide or supercritical carbon dioxide would be introduced into the mixer 38 before the control system 109 could react to close control valve 46. This would produce a supercritical carbon dioxide-rich slug or volume of solution which could disrupt the dispensing operation.

In the presently preferred embodiment, the back pressure regulator 110 is set at a pressure of about 1700 psi which produces a pressure of at least about 1700 psi on the output side of circulating pump 34. The pressure level around the loop is thus well above the critical pressure of 1070 psi required to maintain the carbon dioxide in supercritical state. This pressure range has also been found to be suitable for atomization of the solution upon discharge from the dispensing device 12. Accordingly, the high pressure pump 34 is effective to boost the pressure within recirculation line 24 from a level of about 1350 to 1400 psi at its input side to a level of about 1700 psi at its output side which is maintained by the back pressure regulator 110. As discussed below, the control system 109 is operative to maintain at least about a 200 psi pressure differential across the pump 34 to avoid stalling.

With reference to the lower portion of FIG. 4, the computer 26 accepts an input from the transducer 39, indicated schematically at block 146, which corresponds to the high pressure measurement, $P_H$, at the output side of pump 34. The computer 26 scales this input to convert it to psi as represented at block 148 and then enters that value in summer 142. The summer 142 compares PH with $P_L$, to determine the actual pressure differential between $P_H$ and $P_L$. This pressure differential is compared with the required minimum pressure differential across high pressure pump 34 as indicated at block 150. If the actual difference between $P_H$ and $P_L$ is greater than about 200 psi, the apparatus 10 is allowed to continue operating without interruption. However, if the actual pressure differential becomes less than about 200 psi, a signal represented by line 152 is generated by computer 26 producing a warning indicated at block 154. In addition, the signal represented by line 152 is processed by the computer 26 as depicted in block 123 as a disable signal to cause the pulse generator circuit 98 to close the control valve 46 and stop the flow of liquified carbon dioxide or supercritical carbon dioxide into the circulation line 24. Disable signal 152 also includes a signal 135 which causes the PID loop to reset the error term to zero.

The response of control system 109 to an actual pressure differential across the pump 34 of less than 200 psi by closing control valve 46, presumes that the control valve 20 which allows liquid coating composition into line 24 has already been closed. As mentioned above, the back pressure regulator 110 holds the pressure at the output side of pump 34 at a level of about 1650–1700 psi.

In order for the pressure at the input side of pump 34 to reach a level within about 200 psi of the output side, $P_L$ would have to be in excess of about 1450 psi. However, the control valve 20 is closed by computer 26 if $P_L$ exceeds about 1400 psi, as discussed above, and thus no more liquid coating composition can be introduced into the system when $P_L$ reaches about 1400 psi. The only way $P_L$ could be increased with control valve 20 closed is to continue introducing liquified carbon dioxide or supercritical carbon dioxide into the line 24. Accordingly, the response of control system 109 to an insufficient pressure differential between $P_H$ and $P_L$ is to close control valve 46.

Because the coating dispensers 12 may be operated intermittently, the control valve 20 which controls the supply of the liquid coating composition into the system may be opened and closed quite frequently. This may have a tendency to cause a pressure variation within the circulation line 24 at least on the input side of the high pressure pump 34. In order to reduce or smooth out such a pressure variation, the accumulator 32 is provided which acts as a "fluidic spring". The accumulator 32 includes a piston (not shown) forming a cavity within its interior which is filled with nitrogen gas initially pressurized to about 700 psi with the piston in a fully extended position. In response to the introduction of the liquid coating composition into the circulation line 24 and accumulator 32, the piston is forced back which pressurizes the nitrogen therein to a level of about 1400 psi with the piston at approximately mid-stroke. The accumulator 32 thus exerts a substantially constant 1400 psi pressure at the input to high pressure pump 34 and effectively dampens or smooths out any pressure fluctuations which may be produced as the control valve 20 is opened to input additional coating material from supply 14 and/or as the coating dispensers 12 are opened and closed, and/or as the pump strokes.

In another aspect of this invention, the bypass line 104 is provided to create an essentially continuous recirculation of at least some of the coating material solution within the circulation line 24. In the presently preferred embodiment, the valve 106 in bypass line 104 is set such that approximately 25% of the total flow travels through the bypass line 104 whereas the remaining 75% of the flow is directed to coating dispensers 12. If the coating dispensers 12 are closed, such 75% flow is directed through line 108 and back to the circulation line 24 where it is combined with the other 25% passing through bypass line 104.

An advantage of continuously recirculating at least some of the solution through the bypass line 104 is to avoid the creation of a supercritical carbon dioxide-rich slug or volume of solution during operation. It is contemplated that in some instances the supercritical carbon dioxide may collect within some of the system elements, such as the accumulator 32, and any pockets of concentrated supercritical carbon dioxide would be broken up by a recirculated flow of this solution through line 24.

Figure 5:
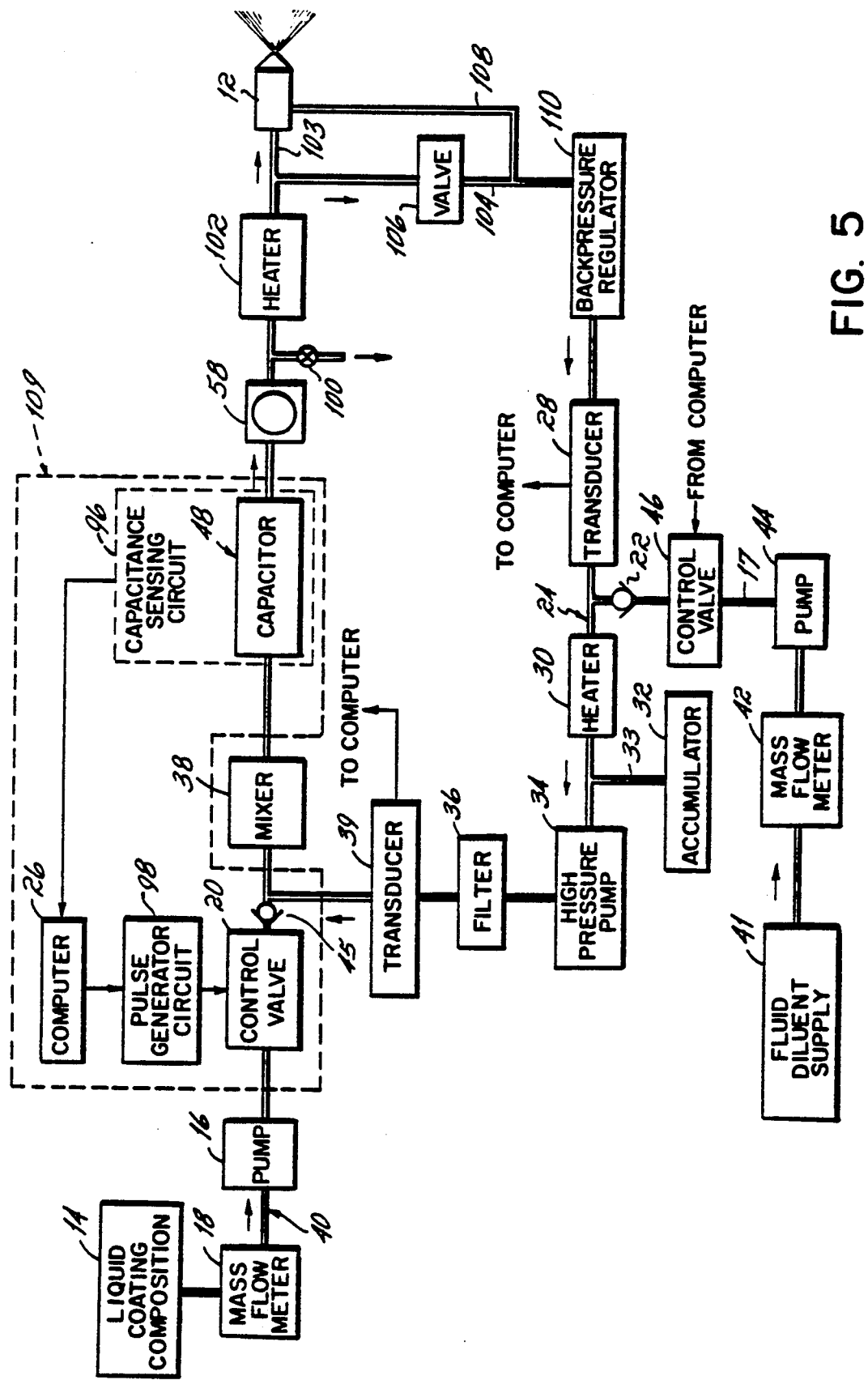
FIG. 5 is an alternative embodiment of the apparatus illustrated in FIG. 1.

Alternative Circulation Loop Embodiment of FIG. 5

In the embodiment illustrated in FIG. 1, the liquid coating composition is introduced on the input side of the high pressure pump 34 while the liquified carbon dioxide or supercritical carbon dioxide is introduced on the output side of high pressure pump 34. Additionally, the control system 109 is described as being operative to open and close the control valve 46 associated with the supply of fluid diluent in response to the sensed parameter, i.e., the capacitance or dielectric constant of the coating material formulation.

With reference to FIG. 5, an alternative embodiment is schematically illustrated in which the position of the source of fluid diluent and liquid coating composition are reversed so that the fluid diluent is introduced at the input side of high pressure pump 34 whereas the liquid coating composition is introduced on its output side. All of the other components of the system depicted in FIG. 5 are identical to those in FIG. 1, and common elements are given the same reference number in each FIG.

Specifically, the fluid diluent supply 41, mass flow meter 42, pump 44 and control valve 46 associated with the supply of liquified carbon dioxide or supercritical carbon dioxide are located at the bottom of FIG. 5 and are operative to introduce fluid diluent through a line 17 at a point along the circulation line 24 upstream from the high pressure pump 34 on its input side. The liquid coating composition supply in FIG. 5 is moved to the position occupied by the supercritical fluid supply in FIG. 1. That is, the supply of liquid coating composition 14, mass flow meter 18, pump 16 and control valve 20 associated with the liquid coating composition supply are connected by a line 40 to the circulation line 24 immediately upstream from the mixer 38 and downstream from or on the high pressure side of the pump 34.

It is contemplated that in the embodiment of FIG. 5, the voltage output $V_o$ from the capacitor 96 would be correlated to the liquid coating composition content within the formulation instead of the supercritical fluid diluent content. In response to variations in the capacitance of the formulation sensed by capacitor 48, the computer 26 is operative to open and close the control valve 20 to control the flow of liquid coating composition into the circulation line 24 instead of the flow of supercritical fluid. Likewise, in this embodiment the flow of fluid diluent into the loop is controlled in response to pressure transducer 28. Such control of the flow of liquid coating composition and supercritical fluid into the loop is obtained in the same manner as described above in connection with the embodiment of FIG. 1 except that the positions of the liquid coating composition supply and the fluid diluent supply have been reversed.

Considered together, the embodiments of FIGS. 1, 1A and 5 provide for the control of the fluid diluent content of the formulation by sensing a parameter of the formulation which is either correlated to the fluid diluent content or the liquid coating composition content of the formulation. Adjustment of the flow of either one of the two components, or both, is made dependent on this sensed parameter to obtain the desired ratio of fluid diluent to liquid coating composition within the formulation.

Figure 6:
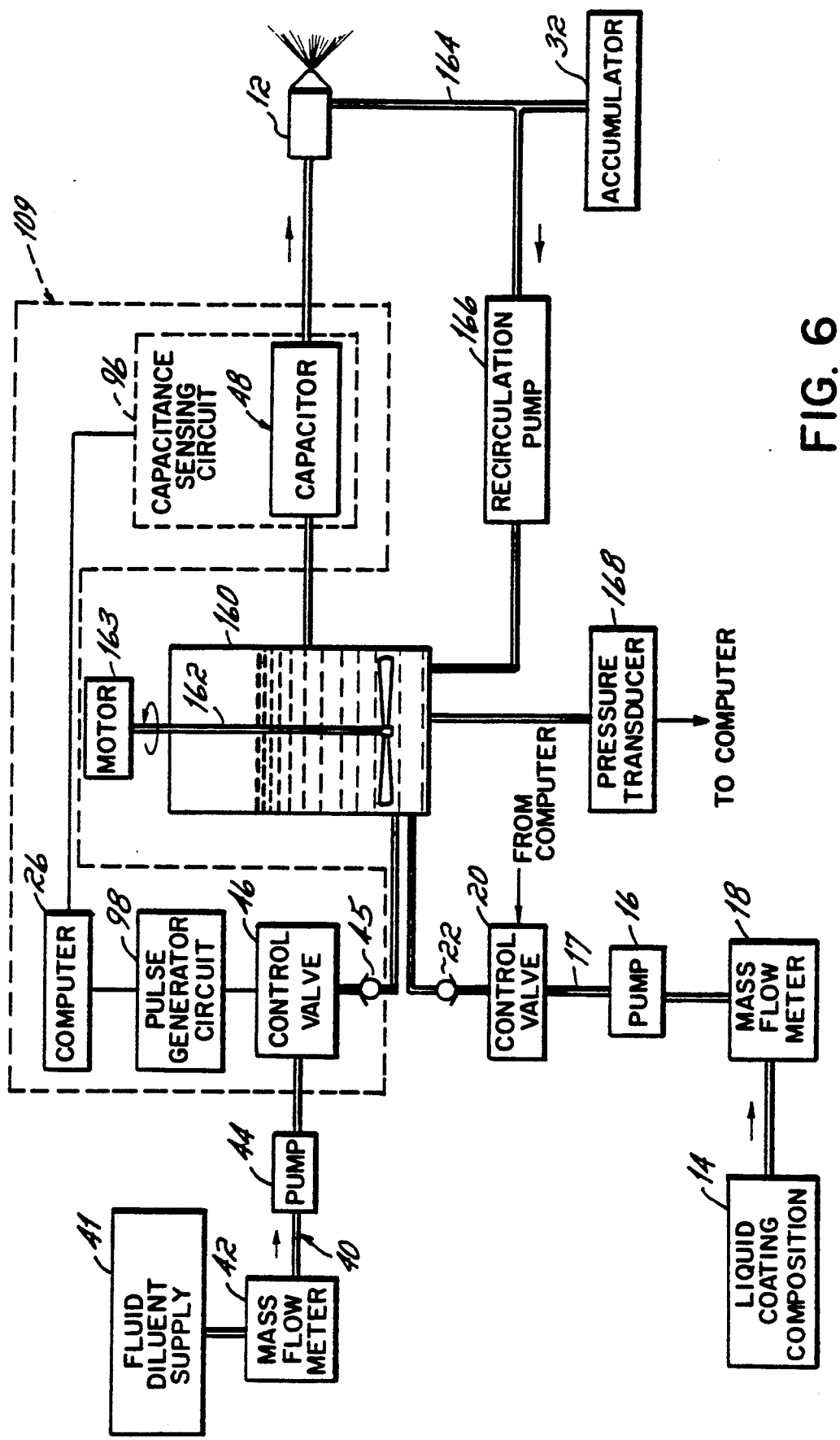
FIG. 6 is a still further embodiment of the apparatus herein illustrated in schematic form.

Tank Embodiment of FIG. 6

Referring now to FIG. 6, a still further embodiment of this invention is illustrated. This embodiment is similar in many respects to that illustrated in FIG. 1 and common structure in both FIGS. are given the same reference numbers. Preferably, the components for supplying the fluid diluent and the liquid coating composition are identical in FIGS. 1 and 6, but instead of a mixer 38, the embodiment of FIG. 6 employs a high pressure tank 160 having an agitator 162 driven by a motor 163 into which the liquid coating composition and fluid diluent are introduced. These components are intermixed within the pressure tank 160 by agitator 162 and discharged through a capacitor 48 of the type employed in FIG. 1. The same control system 109 described above in connection with FIG. 1 is utilized for controlling the supply of fluid diluent to the pressure tank 160.

The coating material formulation formed within the pressure tank 160 is directed through the capacitor 48 to one or more dispensers 12 and then through a return line 164 and recirculation pump 166 back to the pressure tank 160. It is contemplated that at least some of the coating material would be continuously recirculated through return line 164, even with the dispenser 12 open, whereas the entire flow of the formulation is recirculated through return line 164 when the dispenser 12 is closed.

Preferably, a pressure transducer 168 communicates with the interior of tank 160 for sensing the internal pressure thereof. The pressure transducer 168 produces an output accepted by the computer 26, which, in turn, controls the operation of the control valve 20 associated with the supply of liquid coating composition. In order to obtain a formulation having a suitable ratio of supercritical carbon dioxide to liquid coating composition, the pressure in tank 160 must be maintained at a predetermined level. The control system 109 is effective to maintain such pressure within a preferred range of this predetermined level by opening or closing the control valve 20 which introduces liquid coating composition into the tank 160.

Figure 8:
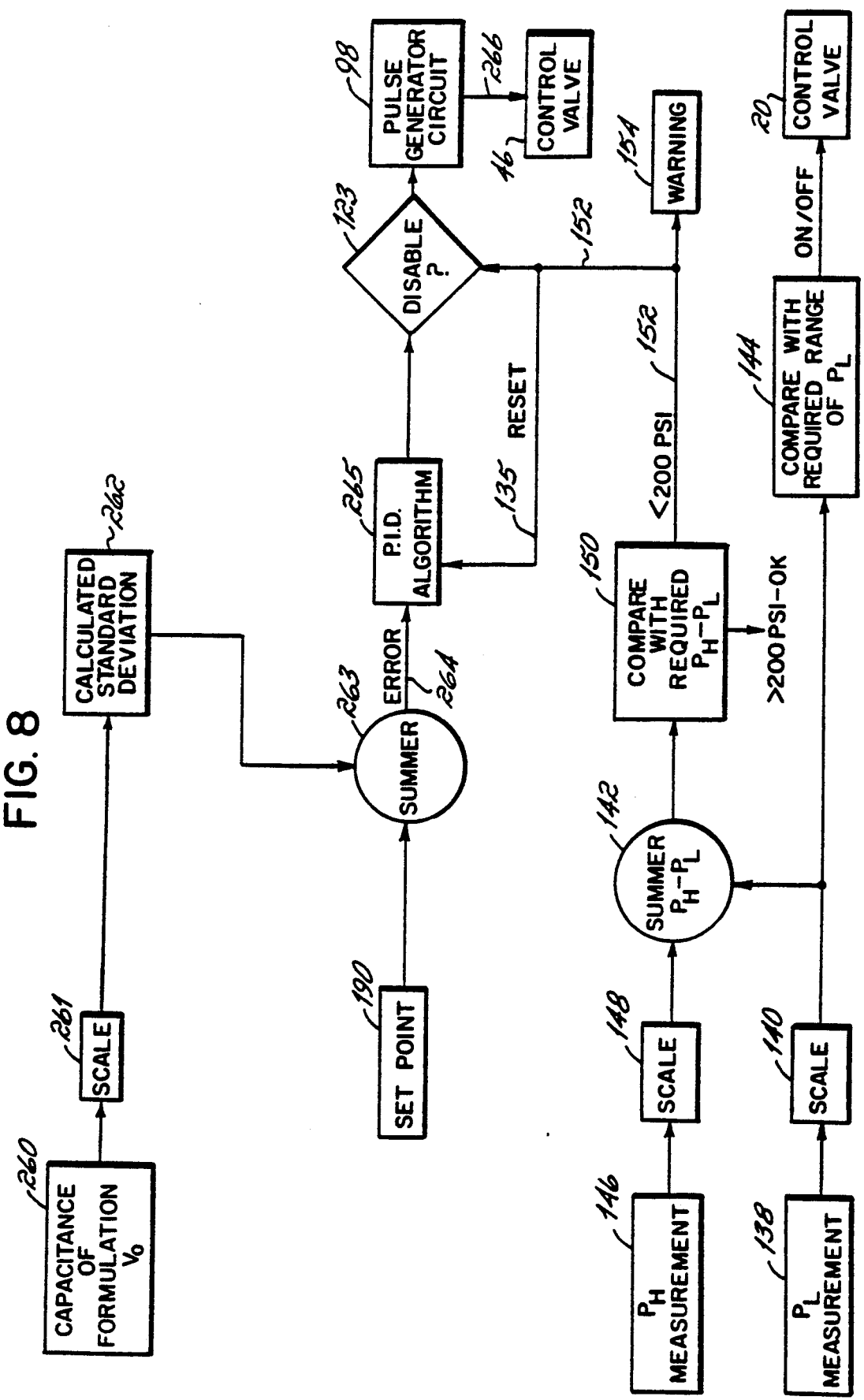
FIG. 8 is an alternative embodiment of a functional block diagram illustrating the operation of the control system when a multiple phase coating material formulation is circulated through the system which is producing a widely varying output signal from the capacitor.
Figure 9:
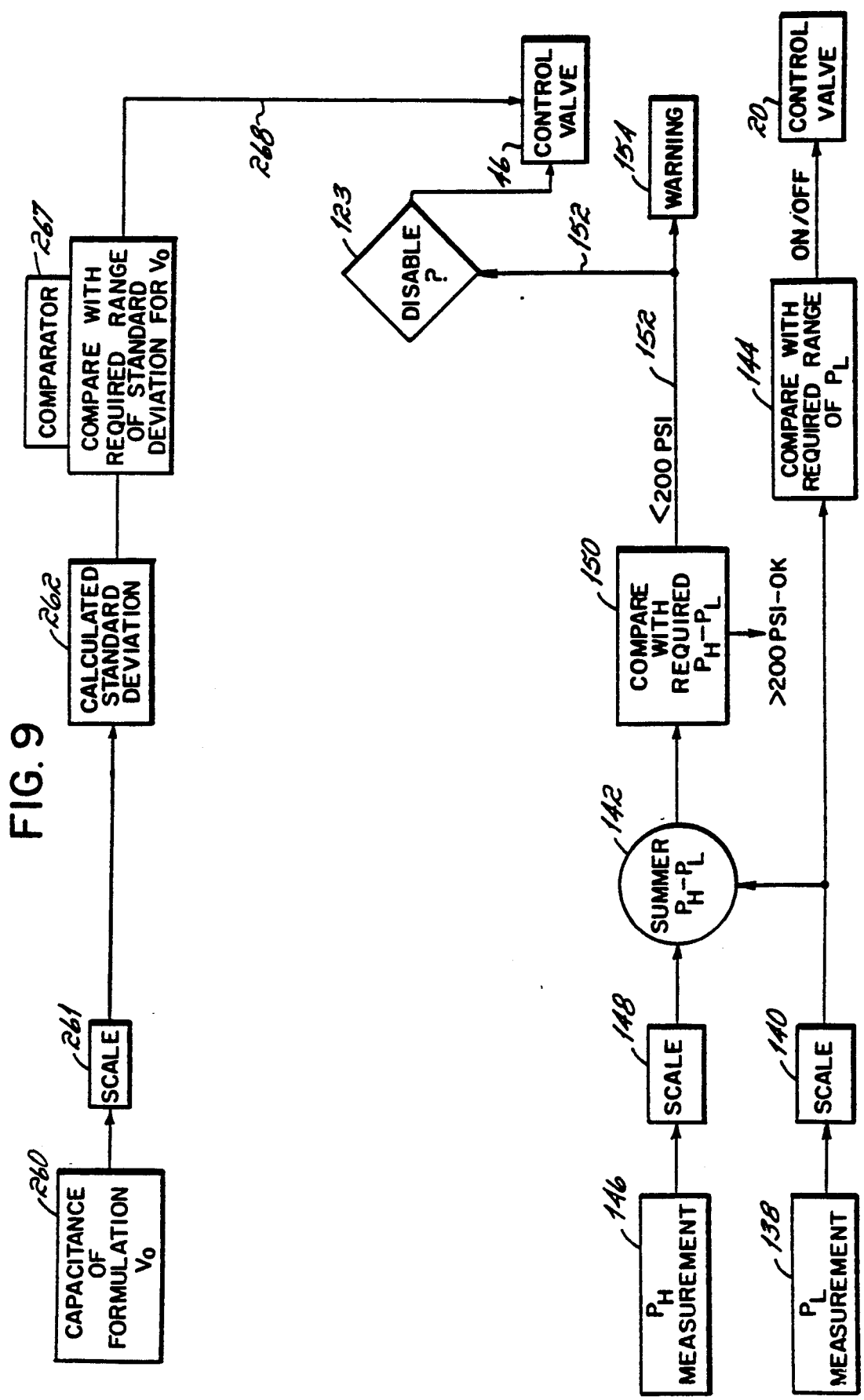
FIG. 9 is an alternative embodiment of the functional block diagram shown in FIG. 8.

Variability Determining Embodiments of FIGS. 8 and 9 For Multiple Phase Formulations The previous discussion of the embodiment illustrated by the top line of blocks in FIG. 4 focused on coating material formulations containing liquid coating compositions whose application characteristics are optimized when the formulation is maintained in single phase prior to delivery to the dispenser 12. It has been discovered, however, that some liquid coating compositions have application characteristics which are optimized by producing a two phase or other multiple phase coating material formulation prior to delivery to the dispenser 12.

One means of operating the system of the present invention in situations where it is desirable to maintain the formulation in a multiphase condition is illustrated in the embodiment of FIGS. 8 and 9. In this embodiment, the apparatus 10 described in connection with FIG. 1 is employed except that the software within computer 26 is modified. FIGS. 8 and 9 depict functional operations performed by the software of control system 109 of apparatus 10 which ensure that the percentage or proportion of supercritical carbon dioxide is maintained within a predetermined range, in excess of the amount necessary to maintain the formulation in single phase, so that the coating material formulation is provided to the dispenser 12 in the desired multiple phase condition.

With reference to FIGS. 1 and 8, a calibration procedure is initially undertaken in which the ratio or proportion of supercritical carbon dioxide to liquid coating composition is varied to obtain the desired multiple phase coating material formulation. Control valve 20 is opened by computer 26 to permit the introduction of liquid coating composition into the circulation line 24 where it is fed through high pressure pump 34 and filter 36 and through the mixer 38 to fill circulation line 24 to the desired pressure. The control valve 46 is then opened by the computer 26 to introduce liquified carbon dioxide into the circulation line 24 which is quickly converted to the supercritical state as discussed above. The supercritical carbon dioxide is directed into the mixer 38 for combination with the liquid coating composition to form the coating material solution. The solution is discharged from mixer 38 into the capacitor 48 or 200 which forms a part of a capacitance sensing circuit 96 as described above.

In contrast to the embodiment illustrated by the top line of blocks in FIG. 4, in this embodiment the optimal fluid diluent ratio for spraying the formulation occurs in the multiphase region of the phase map for the formulation, and, consequently, during the calibration mode the capacitor 48 or 200 in this embodiment measures the capacitance of a multiple phase formulation which is affected by the presence of second phase bubbles, and possibly other multiple phase components, so that a highly variable $V_o$ signal is produced. This output signal $V_o$ is processed through a standard deviation routine as in block 116 in FIG. 4. The standard deviation routine generates a standard deviation value which is directly correlated to the frequency of the highly variable signal produced by the second phase material within the solution as sensed by the capacitor 48.

The standard deviation values for the voltage $V_o$ are accepted as an input by the computer 26 where they are stored as the calibration procedure continues. When the operator visually determines that the coating material solution being dispensed from the coating dispenser 12 has optimum application characteristics, he or she instructs the computer 26 to record the current value for the standard deviation of voltage $V_o$. This valve is used as a reference or set point, identified by block 190 in FIG. 8, which is indicative of the percentage or proportion of supercritical carbon dioxide desired within that particular coating material solution to obtain optimum application characteristics.

It has been found through experimentation that the standard deviation of the capacitance sensed by the capacitor 48 or 200 when the second phase bubbles are present within the formulation can be relatively accurately correlated to the supercritical carbon dioxide content of the solution since the greater the content of supercritical carbon dioxide, the greater the size and number of second phase bubbles. For example, a decrease in the degree of variability of the signal, which is reflected as a decrease in the standard deviation value for $V_o$, is obtained when there is a decrease in the supercritical carbon dioxide content of the solution, and vice versa.

With reference to FIG. 8, the functional operations performed by control system 109 are depicted which ensure that the percentage or proportion of supercritical carbon dioxide is maintained at the desired ratio. The voltage output from the capacitance sensing circuit 96, i.e., $V_o$ as depicted at block 260, varies as a function of the quantity of second phase bubbles of the solution as sensed by the capacitor 48. This voltage output $V_o$ is accepted as an analog input to the computer 26 which scales the voltage output as represented at block 261 to convert it to an input form which can be utilized by the computer 26. In the presently preferred embodiment, computer 26 samples voltage $V_o$ four times per second and these $V_o$ measurements are processed in the computer 26 in block 262 to determine the calculated standard deviation of the most recent forty $V_o$ measurements. This calculated or actual standard deviation is then compared in a summer 263 with the standard deviation set point 190, i.e., the standard deviation value obtained during the calibration procedure described above.

The difference between the actual supercritical carbon dioxide content of the solution represented by the output of block 262, and the optimum supercritical carbon dioxide content represented by the set point 190, is output from the summer 263 as an error signal 264. This error signal 264 is accepted as an input to a standard PID loop function implemented in software within the computer 26 as represented by block 265 in FIG. 8. The PID loop function executed is the same type as described above in connection with FIG. 4, except that the proportional, integral and derivative coefficients are chosen to match the time lags and gains present within the apparatus 10 when employed to form and dispense a multiple phase coating material formulation.

The output of the PID loop represented at block 265 is passed to the pulse generator circuit 98 which produces an output represented at 266 to the control valve 46. The pulse generator circuit 98 controls the duty cycle of the control valve 46 in the same manner as described above in connection with FIG. 1. The only difference is that because the set point 190 and the current standard deviation value for $V_o$ are correlated to the presence of second phase bubbles within the solution, the control valve 46 is effective to introduce sufficient fluid diluent into the circulation loop 24 to maintain the desired two phase, or other multiple phase, characteristics of the solution before it is delivered to the dispenser 12. The remainder of the apparatus 10 as employed in this embodiment is identical to that described above in connection with FIG. 1.

With reference to FIG. 9, an alternative embodiment is illustrated which is essentially a simplified version of the apparatus disclosed in FIG. 8. In this embodiment, the standard deviation of voltage outputs $V_o$ from capacitor 48 or 200 is obtained in the identical manner described above in connection with FIG. 8, but instead of comparing this actual or standard deviation with a predetermined set point 190, the output from block 262 is input to a comparator 267 whose output 268 is directly connected to control valve 46. In this FIG. 9 embodiment, an acceptable range of standard deviation values for $V_o$ is obtained experimentally by observation of the application characteristics of a given material coating formulation over a range of supercritical carbon dioxide contents. The supercritical carbon dioxide content of the solution is varied between a minimum percentage, and a maximum percentage, wherein acceptable application characteristics are obtained. The standard deviation values for these minimum and maximum range limits are stored in the computer 26 as the desired standard deviation value for $V_o$.

During operation of the apparatus 10, the actual or calculated standard deviation of the $V_o$ outputs, depicted at block 262, is compared with the acceptable range of standard deviation values for $V_o$ in the comparator depicted at block 267, to produce the output 268 which governs the duty cycle of control valve 46. In the event the actual or calculated standard deviation is below the acceptable range, the comparator 267 functions to open control valve 46 and allow more fluid diluent into the circulation line 24. On the other hand, if the actual or calculated standard deviation is greater than the uppermost limit of the range of standard deviation values, the control valve 46 is closed to prevent the flow of additional fluid diluent into the circulation line 24. The embodiment of FIG. 9 is therefore analogous to that disclosed in FIG. 8, except it is a less accurate, although potentially more stable, version of controlling the supercritical carbon dioxide content of the formulation. The FIG. 9 embodiment is potentially more stable because it is much easier to keep the standard deviation value within a range than it is to keep the value on a set point.

In another aspect of this invention, it has been determined that the calculations necessary to obtain the standard deviation of the signals $V_o$ are difficult to perform in real time. For example, in the embodiment of FIG. 8 described above, the computer 26 samples voltage outputs $V_o$ four times per second and then processes such $V_o$ measurements to determine the standard deviation of the most recent forty of such measurements. In order to reduce such time-consuming calculation of standard deviation, an improved control algorithm is incorporated in the software of computer 26.

Initially, the incoming capacitance signals $V_o$ from capacitance sensing circuit 96 are filtered in accordance with the following formula to determine a representative value for the most recent capacitance value samples:

$$F_t = f \times C_t + (1-f) \times F_{(t-1)} \qquad (1)$$

Where:
 f = a fraction between 0 and 1 chosen according to the frequency of the oscillations of the highly variable signal produced by second phase bubbles;
 $F_t$ = the representative value;
 $F_{(t-1)}$ = the representative value from the previous iteration; and
 $C_t$ = current actual capacitance value.

Having determined a representative value $F_t$ for the incoming capacitance signal, this value is then subtracted from the current actual capacitance value in accordance with the following formula:

$$S_t = C_t - F_t \qquad (2)$$

where:
 $S_t$ = the instantaneous absolute value difference between the representative value of the most recent samples and the current actual value.

The control algorithm then functions to average the value obtained from Equation (2) above, over a predetermined time period, using a second filter contained within the software of the computer 26 in accordance with the following formula:

$$SF_t = ff \times S_t + (1-ff) \times SF_{(t-1)} \qquad (3)$$

Where:
 ff = another fractional value between 0 and 1 chosen according to the frequency of the oscillations of the highly variable signal;
 $SF_t$ = a value representative of the variability of the V signal to be used in lieu of the standard deviation value; and
 $SF_{(t-1)}$ = the $SF_t$ value for the previous iteration.

It has been found that the foregoing control algorithm can be used to obtain a representative value $SF_t$ for the highly variable signal created by the presence of second phase bubbles, or other multiphase forms within the formulation, which can be compared to the set point 190 obtained during the calibration procedure described above, where the value for set point 190 is also obtained using this algorithm. Moreover, the calculations to obtain $SF_t$ can be made in real time to avoid delays in the operation of the system. Calculations made to obtain $SF_t$ can also obviously and preferably be used in lieu of the standard deviation range 267 discussed above.

Figure 10:
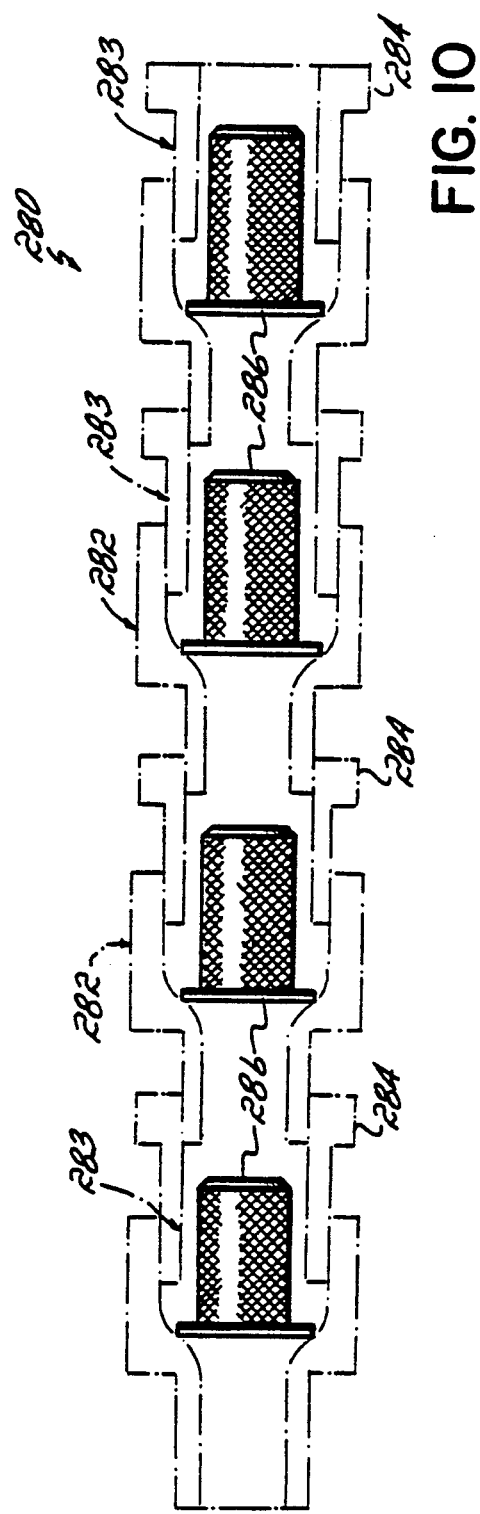
FIG. 10 is a schematic, elevational view of a filter employed as a replacement for the mixer in the apparatus herein.

Bubble Sizing Embodiment of FIG. 10 To Reduce Variability of Signal With Multiple Phase Formulations As mentioned above, the operations of computer 26 depicted in functional block diagrams of FIGS. 8 and 9 can be utilized where the ratio of fluid diluent to coating composition corresponding to an optimal spray pattern produces a multiple phase coating material formulation in the circulation loop. In the FIG. 8 and 9 embodiments, the highly variable signal produced by the multiple phase formulation is input to a variability determining means, such as a standard deviation routine, to produce a standard deviation value, e.g., a set point or range, which can be used for control. As mentioned above, it is believed that when forming multiple phase formulations, the bubbles or other dispersed phases within the formulation can become larger than the space 82 between the plates 76, 78 of capacitor 48, or the gap 212 between the cylindrical electrode 210 and block wall 205 of capacitor 200. As these large bubbles move between the space 82 in capacitor 48 or gap 212 in capacitor 200, the output voltage $V_o$ from the capacitance sensing circuit 96 widely fluctuates producing a highly variable signal which disrupts the accuracy of the capacitance measurement, and, therefore, the accuracy of the control of the fluid diluent which is input into the loop. This highly variable signal results from the capacitor 48 or 200 alternately reading the capacitance of a dispersed second phase supercritical fluid rich bubble, for example, and then the continuous, liquid coating composition rich phase alone or in combination with second phase bubbles.

In order to reduce the variability of the signal from capacitance sensing circuit 96 with multiple phase formulations, a bubble sizing device 280 of the type illustrated in FIG. 10 can be inserted in the apparatus 10 in place of mixer 38 in order to reduce the size of dispersed phase components of the formulation such as second phase bubbles. The bubble sizing device, or filter, 280 comprises a series of adaptors 282 interconnected by bushings 284. In the presently preferred embodiment, each adaptor 282 is formed with a stepped throughbore 283 which varies in diameter from about one-quarter inch to about three-eighths inch as illustrated in FIG. 10. A mixing screen 286 is located within both the smaller and larger diameter portions of the stepped throughbore 283 in each bushing 284, directly in the path of the coating material formulation moving therethrough. A number 100 mesh screen such as sold by Nordson Corporation of Amherst, Ohio under Nordson Part No. 271-659 is one example of a mixing screen 286 suitable for use herein.

The bubble filter 280 limits the size of the bubbles, or other dispersed multiple phase forms produced within multiple phase coating material formulations, to a size less than the space 82 between the electrodes 76, 78 of capacitor 48, or the gap 212 between the cylindrical electrode 210 and block wall 205 of capacitor 200. This reduces the variability of the characteristic output voltage $V_o$ from the capacitance sensing circuit 96 because the capacitors 48 or 200 now read an average capacitance of homogeneously intermixed phases of multiple phase formulations rather than alternately reading the capacitance of a dispersed second phase bubble, for example, and then the continuous first phase material. It is contemplated that the bubble filter 280 might reduce, or eliminate, the need for the modifications to the software of computer 26 described above in connection with FIGS. 8 and 9 which are used to read the highly variable signal produced by capacitance sensing circuit 96 without the bubble sizing device 280. It is believed, however, that such modifications to the software may nevertheless be desirable in the event that larger bubbles reform, when using some types of coating material formulations, in the time it takes for such formulations to pass from the bubble sizing device 280 into the capacitor 48 or 200. Accordingly, the variability of the signal can be nearly completely controlled with some coating material formulations using the device 280, but with other formulations the device 280 may only reduce variability of the signal in which case the FIGS. 8 and 9 software modifications are useful.

A second purpose of the bubble sizing device 280 is to produce a relatively completely mixed and homogeneous coating material formulation. In fact, it is believed that for some types of formulations, the bubble sizing device 280 can replace the mixer 38 entirely to effectively homogeneously combine the supercritical fluid and liquid coating composition. As a result, a more uniform spray pattern may be produced on a target substrate.

CONTROL BASED ON UTILIZATION OF VIRGIN COATING COMPOSITION PARAMETER WITH FORMULATION PARAMETER

In each of the above-described embodiments of this invention, it has been assumed that the capacitance or other parameter of the liquid coating composition remains unchanged throughout operation of the system. It has been discovered, however, that the capacitance of a particular liquid coating composition can vary from batch to batch, and even during the course of an operating run due to thermal changes and other variables. The embodiments of this invention described in this section provide a means to account for changes in the capacitance of the virgin or new liquid coating compositions so that measurements of the capacitance of the formulation within circulation line 24 can be properly correlated to the change in supercritical fluid content of the formulation.

Figure 11:
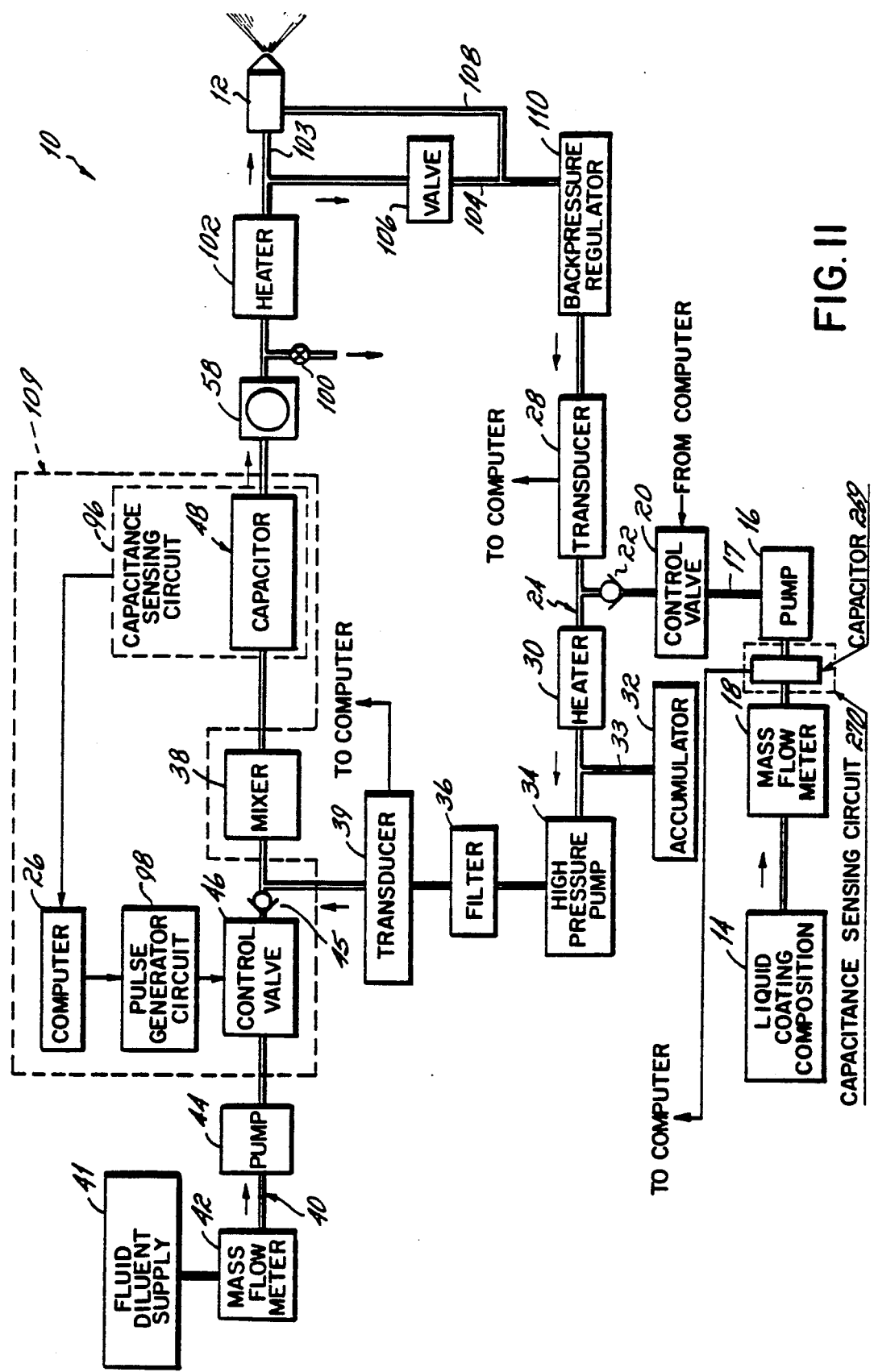
FIG. 11 is a view similar to FIG. 1 but with the addition of a capacitance sensor for the virgin liquid coating composition.
Figure 12:
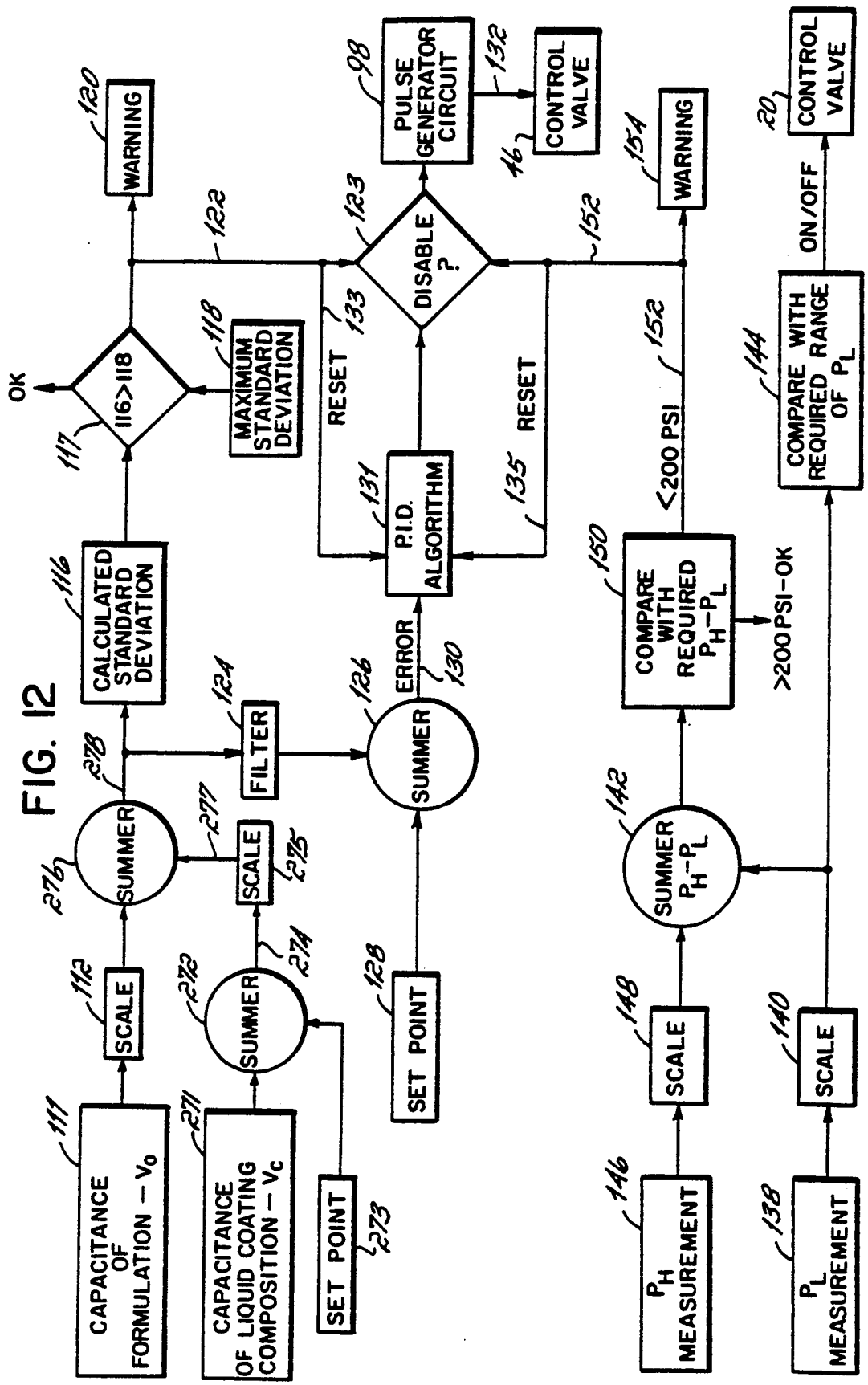
FIG. 12 is a functional block diagram similar to FIG. 4 except adapted for use with the embodiment of FIG. 11.

Embodiment of FIGS. 11 and 12 For Comparing Virgin Coating Composition Parameter To A Known or Expected Reference Value One presently preferred embodiment of this aspect of the invention is illustrated in FIGS. 11 and 12. In this embodiment, an apparatus 10 is illustrated which is identical to that disclosed in FIG. 1 with the exception of the addition of a second capacitor 269 forming part of a capacitance bridge, or capacitance sensing circuit 270, which is located within the line 17 between the source of liquid coating composition 14 and the pump 16. The capacitor 269 and capacitance sensing circuit 270 are structurally and functionally identical to the capacitors 48 or 200, and the capacitance sensing circuit 96, respectively, described in connection with FIGS. 1–4. The only difference is that the characteristic voltage output $V_o$ from the capacitance sensing circuit 270 is representative of the capacitance of the virgin liquid coating composition instead of the capacitance of the coating material formulation.

With reference to FIG. 12, a functional block diagram is provided of the software executed by computer 26, which is identical to that shown in FIG. 4 and described above, except for the following additions. The capacitor 269 senses the capacitance of the virgin liquid coating composition, as represented at block 271, thereby causing capacitance bridge or sensing circuit 270 to produce a characteristic output voltage $V_c$. This output voltage $V_c$ is compared in a summer 272 with a reference value, or set point, depicted at block 273, which represents the known or expected capacitance of the liquid coating composition being dispensed. If the actual or sensed capacitance is either less than or greater than the expected capacitance reference value or set point depicted at block 273, the summer 272 is operative to produce an error signal output 274 which is scaled at block 275 to put it in a form which can be accepted by a second summer 276. This summer 276 subtracts the scaled error signal output 277 from the scaled voltage output from the capacitance sensing circuit 96, i.e., voltage output $V_o$ as depicted at block 111 which is obtained in the manner identical to that described above in connection with FIG. 4. This corrected $V_o$ value comprises output 278 from summer 276 which is processed in the computer 26 at block 116 to determine the standard deviation of a given number of the most recent samples of the corrected $V_o$. The operation of the system then proceeds from block 116 in the identical fashion as described above in connection with FIG. 4.

The embodiment of FIGS. 11 and 12 therefore provides a means to adjust the calculation of standard deviation for the $V_o$ measurements for a coating material solution in accordance with changes in the capacitance of the virgin liquid coating composition introduced into the circulation line 24 as compared to the known or assumed capacitance of the liquid coating composition. The FIGS. 11 and 12 embodiment also provides a means to use this corrected $V_o$ when operating off of the $V_o$ set point 128 in PID control in the manner explained above with reference to FIG. 4. Changes to the capacitance of the liquid coating composition directly affect the capacitance of the coating material formulation, and, therefore, a more accurate indication of the capacitance of the formulation attributable to changes in the fluid diluent content is provided with the embodiment of FIGS. 11 and 12.

Embodiments of FIGS. 13 and 14 For Utilizing Virgin Coating Parameter Directly For Improved Control In the above-described embodiment of FIGS. 11 and 12, correction for changes in the capacitance of the virgin liquid coating composition are made with reference to a known or assumed value of the capacitance for such composition. For some types of materials, such information may not be readily available or provided by the manufacturer. Currently preferred embodiments of this invention are illustrated in FIGS. 13 and 14 where the capacitance or other parameter of the virgin liquid coating composition is either determined directly at the beginning of a production run before the fluid diluent is added (FIG. 13), or directly sensed on a continual basis during the course of a production run (FIG. 14).

With reference to FIG. 13, circuit 290 comprises an embodiment of capacitance sensing circuit 96 which allows the virgin resin capacitance to be determined at the beginning of a production run. Circuit 290 includes a sine wave/square wave generator 292 operated at a frequency of about 100 KHz, for example, which is connected by a line 302 to a transformer 294 and by a line 303 to a double pole, double throw (DPDT) switch 296. The transformer 294 is connected by the upper line 308 of a twin co-ax cable 298, having a grounded outer sheath 299, to the capacitor 48 (or capacitor 200). In this embodiment, the transformer 294 is connected to a zero adjust capacitor 300, the function of which will be described later below. All of these components are readily commercially available and their construction per se forms no part of this invention.

The operation of the circuit 290 is as follows. The generator 292 transmits an AC voltage sine wave through line 302 to the transformer 294 such that current flows in one direction through the first primary coil 304 of transformer 294, and in the opposite direction through its second primary coil 306. The current is directed from the first primary coil 304 through the upper line 308 of the twin co-ax cable 298, through the capacitor 48 and then to ground. The current flowing through second primary coil 306 is directed through the lower line 310 of the twin co-ax cable 298, which is free floating at its opposite end, and also through a line 311 to the zero adjust capacitor 300 and then to ground. Because the current in the primary coils 304, 306 flows in opposite directions, the lines 308 and 310 connected thereto cancel the effects of capacitance to ground of the conductors within the twin co-ax cable 298. This eliminates any effect of the cable 298 on the capacitance reading obtained from the capacitor 48, as described below.

The difference in the current flowing through the first primary coil 304 connected to capacitor 48, and the current flowing through second primary coil 306, induces a flux on the core 312 of transformer 294 which generates a current through the secondary coil 314 of transformer 294. This current through secondary coil 314 has two components, namely, a first component attributable to the resistivity of the coating material formulation flowing through the capacitor 48, and a second component attributable to the capacitance of the formulation. While the resistive component of the current is in phase with the voltage from generator 292 which excites capacitor 48, the capacitive component of the current leads the voltage by 90°. Thus, there is a 90° phase difference between the capacitive and resistive components of the current which are produced in the secondary coil 314. This phase difference is utilized by the circuit 290 to separate the resistive and capacitive components of the current so that only the capacitance component is measured, as explained in more detail below.

Separation of the resistive and capacitive components of the current from the secondary coil 314 is achieved by the generator 292, DPDT switch 296, and Op Amp 500 with feed back resistor 502 and capacitor 504. As schematically illustrated in FIGS. 13A–13E, the capacitive component of the current through secondary coil 314 is shown as $I_{c1}$, the resistive component is $I_{R1}$, and two 180° "measurement intervals" are designated $M_1$ and $M_2$, respectively. The current through secondary coil 314 is a combination of $I_{C1}$ and $I_{R1}$, but these components are 90° out of phase with one another, as viewed in FIG. 13A, while $I_{R1}$ is in phase with the voltage from generator 292 which excites capacitance cell 48. In the presently preferred embodiment, the generator 292 produces a square wave 600 of the same frequency, but which leads the voltage exciting the capacitor 48 and primaries of transformer 294 by 90°. This square wave 600 from the generator 292 causes the DPDT switch 296 to change position at 180° intervals, but 90° out of phase with the sine wave driving the primaries on line 302. By transmitting the square wave 600 in FIG. 13B from generator 292 to the switch 296 90° out of phase with the voltage sine wave signal which excites the primaries of transformer 294 (i.e., leading the voltage sine wave by 90°), the measurement intervals $M_1$ and $M_2$ correspond to periods where the capacitive component $I_C$ is either all positive ($M_1$) or all negative ($M_2$), while the resistive component $I_R$ has both positive and negative values.

During the $M_1$ interval, the throws of switch 296 are in the upper position shown in FIG. 13, and the current from secondary 314 is allowed to pass unaltered into Op Amp 500. During the $M_2$ interval, however, the throws of switch 292 are moved downwardly to the lower position of FIG. 13 shown by dotted lines to contact the other pair of poles of switch 292. The result of this reversal of the throws is that the direction of current into Op Amp 500 is reversed, effectively inverting the $I_{C1}$ and $I_{R1}$ waveforms during the $M_2$ interval to produce the $I_{C2}$ waveform of FIG. 13C and the $I_{R2}$ waveform of FIG. 13D. The waveforms $I_{C2}$ and $I_{R2}$ are superimposed upon one another to form the $I_{C2}+I_{R2}$ waveform of FIG. 13E which is the actual waveform input into Op Amp 500.

Op Amp 500 with its RC feedback network comprised of resistor 502 and capacitor 504 produces an average DC value of waveform $I_{C2}+I_{R2}$ at its output on line 506. With reference to FIG. 13D, it can be appreciated that the average DC value of the $I_{R2}$ component of the $I_{C2}+I_{R2}$ waveform will be zero since the $I_{R2}$ waveform has equal positive and negative portions. The average value of the $I_{C2}$ component of the waveform will therefore be what is output from Op Amp 500 on line 506. Consequently, the effect of the circuit 290 is to filter out the component of current relating to the resistance of the coating material passing through capacitor 48 so that the output of Op Amp 500 is solely a function of the capacitance of the coating material passing through capacitor 48. By filtering out the resistive component of the current, the addition of fluid diluent into the circulation loop can be more closely correlated to true changes in capacitance since capacitance is the parameter of the formulation being measured in the preferred embodiment. If the parameter of the formulation being used was resistance, then alternatively the capacitance component could be filtered out.

Op Amp 500 not only filters out the $I_{R2}$ component of the current, but also converts the average DC value of the $I_{C2}$ component of the current to a voltage. As shown in FIG. 13, this voltage signal is then input into a second amplifier 510, which has an offset voltage input 512. Amplifier 510 converts the voltage inputs to a current output. The offset voltage input 512 sets the zero point and scales the output of amplifier 510 from 0-20 milliamps, for example, for a capacitance range as read by capacitor 48 of 100-200 picofarads. This scaled output is then input to computer 26 which converts it to a digital signal and processes it appropriately for inputting into pulse generator 98.

Having described how the resistive component of the current produced through capacitor 48 is filtered out so that the input to computer 26 is representative of the capacitive current only, the function of zero adjust capacitor 300 will now be described. The circuit 290 is calibrated to account for the capacitance of the virgin liquid coating composition using the zero adjust capacitor 300. In the presently preferred embodiment, virgin liquid coating composition is initially directed through the capacitor 48 or 200, and the zero adjust capacitor 300 is adjusted to produce a current through the second primary coil 306 of transformer 294 which equals the current through first primary coil 304. Because these currents flow in opposite directions, they cancel one another within the transformer 294 and thus no signal is induced in the secondary coil 314. In turn, the output from amplifier 510 into computer 26 is zero. The zero adjust capacitor 300 is left at this set point throughout a production run wherein supercritical fluid is added to the liquid coating composition to form the coating material formulation. During the system operation, the current flowing through the second primary coil 306 is subtracted from the current flowing through the first primary coil 304 connected to capacitor 48 so that the signal induced in the secondary coil 314 by the primary coils 304, 306 is dependent solely on the effect which the supercritical fluid has on the capacitance of the formulation.

The embodiment of this invention illustrated in FIG. 13 therefore allows the operator to obtain a set point for the capacitance of the virgin liquid coating composition by a calibration procedure conducted at the beginning of operation of apparatus 10. Unlike the embodiment of FIGS. 11 and 12, the operator need not rely on an assumed or estimated value for the capacitance of a particular liquid coating composition given by the manufacturer.

Nevertheless, both the embodiments of FIGS. 11 and 12, and FIG. 13, assume that the capacitance of the liquid coating composition remains the same throughout the course of a production run. It is expected, however, that in some applications the capacitance can change during operation of apparatus 10 due to thermal changes or other variables. This problem is addressed by the modified circuit 318 shown in FIG. 14. The circuit 318 is identical in configuration and operation to circuit 290 except for the elimination of the zero adjust capacitor 300 and the addition of a virgin liquid coating composition sensing capacitor 320. The same reference numbers are used in FIG. 14 to identify components common to those shown in FIG. 13.

The capacitor 320 is preferably located in line 17 between the source of liquid coating composition 14 and the circulation line 24, in the same position as capacitor 269 in FIG. 11. Capacitor 320 is connected through a line 321 to the lower line 310 of twin co-ax cable 298 which, in turn, is connected to the second primary coil 306. As a result, the second primary coil 306 is excited with a signal from the capacitor 320 which is representative of the actual capacitance of the virgin liquid coating composition throughout an entire production run. The current flowing through the second primary coil 306 is continuously subtracted from the current flowing through the first primary coil 304 connected to capacitor 48, thus inducing a signal in the secondary coil 314 which only reflects changes in the capacitance of the coating material formulation which can be attributed to changes in the quantity of supercritical fluid therein. This allows for more accurate, and continuous, control of the supercritical fluid content of the coating material formulation than can be obtained with other embodiments of this invention.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

For example, in the illustrated embodiment, the capacitance of the solution is the parameter sensed and correlated to the fluid diluent, e.g., supercritical carbon dioxide, content of the solution to obtain the desired adjustment. It is contemplated, however, that other parameters of the solution could be sensed which can also be correlated to either the liquid coating composition or the fluid diluent content such as pressure drop through a restricted orifice member, velocity of sound in the solution, the absorption of infrared energy at a wavelength uniquely absorbed by the fluid diluent, the viscosity of the solution, the density of the solution and others.

In addition, while in the preferred embodiment coating composition is supplied in response to pressure changes in the system, and the fluid diluent is added in response to variations in the sensed parameter of the coating material formulation, this control system could obviously be reversed with fluid diluent introduced into the loop in response to pressure changes in the system, and coating composition introduced in accordance with variations in the sensed parameter.

As mentioned above in connection with a discussion of FIGS. 1 and 1A, the fluid diluent supply is effective to introduce either liquified carbon dioxide (FIG. 1) or supercritical carbon dioxide (FIG. 1A) into the circulation line 24. The liquified carbon dioxide is quickly converted to the supercritical state within line 24. In describing alternative embodiments of this invention depicted in FIGS. 5, 6 and 11, the FIG. 1 fluid diluent supply is shown wherein liquified carbon dioxide is introduced into the system as the fluid diluent. It should be understood, however, that supercritical carbon dioxide could be supplied from the fluid diluent supply in each of the FIGS. 5, 6 and 11 embodiments with the same structure shown in FIG. 1A.

Therefore, it is intended that the invention not be limited to the particular embodiment disclosed as the best mode contemplated for carrying out this invention, but that the invention will include all embodiments falling within the scope of the appended claims.

We claim:

1. The method of applying a coating material formulation onto a substrate, comprising:
    combining a flow of supercritical fluid diluent with a flow of liquid coating composition to form a coating material formulation;
    circulating the coating material formulation within a recirculation loop at a selected minimum temperature and minimum pressure sufficient to substantially maintain the supercritical fluid diluent in solution in the coating material formulation;
    sensing a parameter of said coating material formulation which is correlated to at least one of the supercritical fluid diluent content and the liquid coating composition content of said coating material formulation;
    producing an output dependent on said sensed parameter;
    controlling the flow of at least one of the supercritical fluid diluent and liquid coating composition which are combined with one another dependent on said output so that a selected ratio of supercritical fluid diluent to liquid coating composition is substantially maintained in said coating material formulation within the recirculation loop;
    transmitting the coating material formulation from the recirculation loop to one or more coating dispensers; and
    applying the coating material formulation onto a substrate.

2. The method of claim 1 in which said step of controlling the flow comprises controlling the flow of at least one of the supercritical fluid diluent and liquid coating composition to produce a substantially single phase coating material formulation.

3. The method of claim 1 in which said step of controlling the flow comprises controlling the flow of at least one of the supercritical fluid diluent and liquid coating composition to produce a substantially multiple phase coating material formulation.

4. The method of claim 1 in which said step of combining a fluid diluent with a liquid coating composition comprises combining supercritical carbon dioxide with a liquid coating composition to form a coating material formulation.

5. The method of claim 1 in which said step of combining a supercritical fluid diluent with a liquid coating composition comprises combining a liquified gas with a liquid coating composition to form a coating material formulation.

6. The method of claim 1 in which said step of sensing a parameter comprises sensing the capacitance of the coating material formulation.

7. The method of applying a coating material formulation onto a substrate, comprising:
    combining a flow of supercritical fluid diluent with a flow of liquid coating composition to form a coating material formulation;
    circulating the coating material formulation within a recirculation loop at a selected minimum temperature and minimum pressure sufficient to substantially maintain the supercritical fluid diluent in solution in the coating material formulation;
    sensing a parameter of said coating material formulation which is correlated to at least one of the supercritical fluid diluent content and the liquid coating composition content of aid coating material formulation, and producing an output depending on said sensed parameter;
    determining the variability of said output over time to produce a calculated output;
    controlling the flow of at least one of the supercritical fluid diluent and liquid coating composition which are combined with one another dependent on a comparison between said calculated output and a selected set point or range so that a desired ratio of supercritical fluid diluent to liquid coating composition is substantially maintained in said coating material within the recirculation loop;
    transmitting the coating material formulation from the recirculation loop to one or more coating dispensers; and applying the coating material formulation onto a substrate.

8. The method of claim 7 in which said step of determining the variability of said output comprises determining the standard deviation of said output produced by said sensing means over a period of time and producing said calculated output.

9. The method of claim 8 in which said step of controlling the flow of at least one of the supercritical fluid diluent and liquid coating composition includes determining a set point or an acceptable range of standard deviation values which are correlated to desired ratios of supercritical fluid diluent to liquid coating composition within said coating material formulation.

10. The method of applying a coating material formulation onto a substrate, comprising:
  combining a flow of supercritical fluid diluent with a flow of liquid coating composition to form a coating material formulation;
  circulating the coating material formulation within a recirculation loop at a selected minimum temperature and minimum pressure sufficient to substantially maintain the supercritical fluid diluent in solution in the coating material formulation;
  sensing a parameter of said coating material formulation which is correlated to at least one of the supercritical fluid diluent content and the liquid coating composition content of said coating material formulation, and producing a first output dependent on said sensed parameter;
  comparing said first output with a selected range of minimum to maximum values, and producing a second output which is dependent on said comparison;
  controlling the flow of at least one of the supercritical fluid diluent and the liquid coating material which are combined with one another dependent on said second output so that desired ratio of supercritical fluid diluent to liquid coating composition is substantially maintained in said coating material formulation within the recirculation loop;
  transmitting the coating material formulation from the recirculation loop to one or more coating dispensers; and
  applying the coating material formulated onto a substrate.

11. The method of applying a coating material formulation onto a substrate, comprising:
  combining a flow of supercritical fluid diluent and a flow of liquid coating composition to form a coating material formulation;
  circulating the coating material formulation within a recirculation loop at a selected minimum temperature and minimum pressure sufficient to substantially maintain the supercritical fluid diluent in solution in the coating material formulation;
  sensing the capacitance of said coating material formulation with a capacitor electrically connected to a source of AC voltage to produce a current output from said capacitor which is correlated to at least one of the supercritical fluid diluent content and liquid coating composition content of said coating material formulation, said current output from said capacitor having a resistive component which is in phase with said AC voltage, and a capacitive component which is 90° out of phase with said AC voltage;
  filtering out said resistive component or said capacitive component of said current output to produce a filtered output which reflects either the capacitive component or the resistive component of said current output;
  controlling the flow of at least one of said supercritical fluid diluent and said liquid coating composition dependent on said filtered output so that a selected ratio of supercritical fluid diluent to liquid coating composition is substantially maintained in said coating material formulation within the recirculation loop;
  transmitting the coating material formulation from the recirculation loop to one or more coating dispensers; and
  applying the coating material formulation onto a substrate.

12. The method of claim 11 in which said step of controlling the flow includes:
  processing said filtered output for comparison with a desired value, or a desired range of values, representing a selected ratio, or range of ratios, of supercritical fluid diluent to liquid coating composition;
  generating an error signal which is utilized to control the flow of at least one of said supercritical fluid diluent and said liquid coating composition dependent on said error signal so that said selected ratio, or range of ratios, of supercritical fluid diluent to liquid coating composition is substantially maintained.

13. The method of applying a coating material formulation onto a substrate, comprising:
  combining a flow of supercritical fluid diluent and a flow of liquid coating composition to form a coating material formulation;
  circulating the coating material formulation within a recirculation loop at a selected minimum temperature and minimum pressure sufficient to substantially maintain the supercritical fluid diluent in solution in the coating material formulation;
  sensing the capacitance of said coating material formulation with a first capacitor which is electrically connected to an electrical power source to produce an output from said first capacitor correlated to at least one of the supercritical fluid diluent content and liquid coating composition content of said coating material formulation;
  measuring the capacitance of said liquid coating composition, prior to combining said liquid coating composition with said supercritical fluid diluent, to produce a liquid coating composition capacitance value;
  subtracting said liquid coating composition capacitance value from said output of said first capacitor to produce a corrected capacitance output;
  controlling the flow of at least one of said supercritical fluid diluent and said liquid coating composition dependent on said corrected capacitance output so that a selected ratio of supercritical fluid diluent liquid coating composition is substantially maintained in the coating material formulation within the recirculation loop;
  transmitting the coating material formulation from the recirculation loop to one or more coating dispensers; and
  applying the coating material formulation onto a substrate.

14. The method of claim 13 in which said step of controlling the flow comprises comparing said corrected capacitance output with a desired value, or a desired range of values, representing a selected ratio, or range of ratios, of supercritical fluid diluent to liquid coating composition, and generating an error signal which is utilized to control the flow of at least one of said supercritical fluid diluent and said liquid coating composition so that said selected ratio, or range of ratios, of supercritical fluid diluent to liquid coating composition is substantially maintained within the coating material formulation.

15. The method of applying a coating material formulation onto a substrate, comprising:
    sensing a parameter of a liquid coating composition and producing a first output representative of said sensed parameter;
    combining a flow of supercritical fluid diluent with a flow of said liquid coating composition to form a coating material formulation;
    circulating the coating material formulation within a recirculation loop at a selected minimum temperature and minimum pressure sufficient to substantially maintain the supercritical fluid diluent in solution in the coating material formulation;
    sensing a parameter of said coating material formulation which is correlated to at least one of the supercritical fluid diluent content and the liquid coating composition content of said coating material formulation, and producing a second output representative of said sensed parameter;
    utilizing said first output with said second output to control the flow of at least one of the supercritical fluid diluent and liquid coating composition which are combined with one another so that a selected ratio of supercritical fluid diluent to liquid coating composition is substantially maintained in said coating material formulation within the recirculation loop;
    transmitting the coating material formulation from the recirculation loop to one or more coating dispensers; and
    applying the coating material formulation onto a substrate.

16. The method of claim 15 in which said step of sensing a parameter of a liquid coating composition comprises sensing the capacitance of virgin liquid coating composition prior to combination with said supercritical fluid diluent.

17. The method of claim 15 in which said step of sensing a parameter of a liquid coating composition comprises continuously sensing the capacitance of virgin liquid coating composition prior to combination with said supercritical fluid diluent, and providing continuous first outputs for utilization with said second outputs.

18. A method of applying a coating material formulation onto a substrate, comprising:
    combining a flow of supercritical fluid diluent and a flow of liquid coating composition to form a coating material formulation;
    circulating the coating material formulation within a recirculation loop at a selected minimum temperature and minimum pressure sufficient to substantially maintain the supercritical fluid diluent in solution in the coating material formulation;
    sensing a parameter of said formulation which is correlated to at least one of the supercritical fluid diluent content and the liquid coating composition content of said formulation, and producing a first output dependent on said sensed parameter;
    comparing said first output with a selected value to produce a second output which is dependent on said comparison; and
    controlling the flow of at least one of the supercritical fluid diluent and the liquid coating material dependent on said second output to substantially maintain a selected ratio of supercritical fluid diluent to liquid coating composition in said coating material formulation within the recirculation loop;
    transmitting the coating material formulation from the recirculation loop to one or more coating dispensers; and
    applying the coating material formulation onto a substrate.

19. The method of claim 18 in which said step of comparing said first output includes initially determining said selected value by:
    (i) combining different proportions of said supercritical fluid diluent and said liquid coating composition to form different coating material formulations;
    (ii) discharging said different material coating formulations and observing at least one selected parameter of each of the discharged coating material formulations;
    (iii) choosing, based on the observed values of said at least one selected parameter, a coating material formulation which has an optimum value of said at least one selected parameter, and recording the proportion of supercritical fluid diluent thereof for use as said selected value.

20. A method applying a coating material formulation onto a substrate, comprising:
    combining a flow of supercritical fluid diluent with a flow of liquid coating composition to form a coating material formulation;
    circulating the coating material formulation within a recirculation loop at a selected minimum temperature and minimum pressure sufficient to substantially maintain the supercritical fluid diluent in solution in the coating material formulation;
    sensing a parameter of said formulation which is correlated to at least one of the supercritical fluid diluent content and the liquid coating composition content of said formulation, and producing a first output dependent on said sensed parameter;
    comparing said first output with a selected range of values to produce a second output which is dependent on said comparison;
    controlling the flow of at least one of the supercritical fluid diluent and the liquid coating material dependent on said second output to substantially maintain a selected ratio of supercritical fluid diluent to liquid coating composition in said coating material formulation within the recirculation loop;
    transmitting the coating material formulation from the recirculation loop to one or more coating dispensers; and applying the coating material formulation onto a substrate.

21. The method of claim 20 in which said step of comparing said first output includes initially determining said selected range by:
    (i) combining different proportions of said supercritical fluid diluent and said liquid coating composition to form different coating material formulations;

(ii) discharging said different coating material formulations and observing at least one selected parameter of each of the discharged coating material formulations;

(iii) choosing, based on observed values of said at least one parameter, a coating material formulation with a maximum proportion of supercritical fluid diluent which has an optimum value of said at least one selected parameter, and choosing, based on observed values of said at least one parameter a coating material formulation with a minimum proportion of supercritical fluid diluent which has an optimum value of said at least one selected parameter, said maximum and minimum proportions of supercritical fluid diluent being used to define said selected range for comparison with said first output.

22. The method applying a coating material formulation onto a substrate, comprising:

combining a flow of supercritical fluid diluent with a flow of liquid coating composition to form a multiple phase coating material formulation including at least a first phase and a second phase appearing as dispersed forms in said first phase;

directing the multiple phase coating material formulation through a means to control the size of said dispersed forms;

circulating the coating material formulation within a recirculation loop at a selected minimum temperature and minimum pressure sufficient to substantially maintain the supercritical fluid diluent in solution in the coating material formulation;

sensing a parameter of said coating material formulation which is correlated to at least one of the supercritical fluid diluent content and the liquid coating composition content of said coating material formulation, and producing a first output representative of said sensed parameter;

comparing said first output with a selected value to produce a second output which is dependent upon said comparison;

controlling the flow of at least one of the supercritical fluid diluent and liquid coating composition which are combined with one another, dependent on said second output, to substantially maintain a selected ratio of supercritical fluid diluent to liquid coating composition in said coating material formulation within the recirculation loop;

transmitting the coating material formulation from the recirculation loop to one or more coating dispensers; and applying the coating material formulation onto a substrate.

23. The method of claim 22 in which said step of sensing a parameter of said multiple phase coating material formulation comprises passing the coating material formulation through a capacitor having a gap across which the capacitance of the formulation is sensed.

24. The method of claim 23 in which said step of directing the multiple phase formulation through a sizing means comprises passing the multiple phase formulation through a filtering means including a mesh having apertures which are smaller than the gap within the capacitor.

25. The method of applying a coating material formulation onto a substrate, comprising:

combining a flow of supercritical fluid diluent with a flow of liquid coating composition in a combining means to form a coating material formulation;

circulating the coating material formulation within a recirculation loop at a selected minimum temperature and minimum pressure sufficient to substantially maintain the supercritical fluid diluent in solution in the coating material formulation;

sensing the pressure differential across a pump located within the recirculation loop which circulates said coating material formulation through said combining means;

producing an output dependent on the sensed pressure differential across said pump;

controlling the flow of at least one of the supercritical fluid diluent and the liquid coating composition which are combined with one another, dependent on said output, to substantially maintain a selected ratio of supercritical fluid diluent to liquid coating composition in the coating material formulation within the recirculation loop;

transmitting the coating material formulation from the recirculation loop to one or more coating dispensers; and applying the coating material formulation onto a substrate.

26. The method of applying a coating material formulation onto a substrate, comprising:

combining a flow of supercritical fluid diluent with a flow of liquid coating composition in a combining means to form a coating material formulation;

circulating the coating material formulation within a recirculation loop at a selected minimum temperature and minimum pressure sufficient to substantially maintain the supercritical fluid diluent in solution in the coating material formulation;

sensing a parameter of the coating material formulation which is correlated to at least one of the supercritical fluid diluent content and the liquid coating composition content of the coating material formulation to produce a first output dependent on the sensed parameter;

sensing the pressure of the coating material formulation to produce a second output correlated to the sensed pressure;

controlling the flow of at least one of the liquid coating composition and the supercritical fluid diluent which are combined with one another dependent on said first output and said second output to substantially maintain a selected ratio of supercritical fluid diluent to liquid coating composition in the coating material formulation within the recirculation loop;

transmitting the coating material formulation from the recirculation loop to one or more coating dispensers; and applying the coating material formulation onto a substrate.

27. The method of applying a coating material formulation onto a substrate, comprising:

combining a flow of supercritical fluid diluent with a flow of liquid coating composition in a combining means to form a coating material formulation;

circulating the coating material formulation within a recirculation loop at a selected minimum temperature and minimum pressure sufficient to substantially maintain the supercritical fluid diluent in solution in the coating material formulation;

sensing a parameter of said coating material formulation which is correlated to at least one of the supercritical fluid diluent content and liquid coating composition content of said liquid coating material formulation;

producing an output dependent on said sensed parameter;

controlling the flow of at least one of the supercritical fluid diluent and the liquid coating composition which are combined with one another dependent on said output;

sensing the pressure differential across a pump located within the recirculation loop which circulates said coating material formulation through said combining means;

producing a second output dependent on the sensed pressure differential across said pump;

controlling the flow of at least one of the liquid coating composition and the supercritical fluid diluent which are combined with one another, dependent on said second output, to substantially maintain a selected ratio of supercritical fluid diluent to liquid coating composition in the coating material formulation within the recirculation loop;

transmitting the coating material formulation from the recirculation loop to one or more coating dispensers; and applying the coating material formulation onto a substrate.

28. The method of claim 27 in which said step of sensing the pressure differential comprises sensing the input pressure at the input side of the pump and sensing the output pressure at the output side of the pump, said step of controlling the flow of at least one of the liquid coating composition and supercritical fluid diluent further comprising starting or stopping the flow of at least one of the liquid coating composition and supercritical fluid diluent to the combining means in response to the sensed input pressure on the input side of the pump to maintain said input pressure within a selected range.

29. The method of applying a coating material formulation onto a substrate, comprising:

combining a flow of supercritical fluid diluent with a flow of liquid coating composition in a combining means to form a coating material formulation;

circulating the coating material formulation within a recirculation loop at a selected minimum temperature and minimum pressure sufficient to substantially maintain the supercritical fluid diluent in solution in the coating material formulation;

sensing a parameter of the coating material formulation which is correlated to at least one of the supercritical fluid diluent content and the liquid coating composition content of the coating material formulation over a selected time period, and producing a first output dependent on said sensed parameter over said selected time period;

comparing said first output with a selected maximum value or range of values to produce a second output which is dependent upon said comparison;

controlling the flow of at least one of the supercritical fluid diluent and liquid coating composition which are combined with one another dependent on said second output to maintain a selected ratio of supercritical fluid diluent liquid coating material within said coating material formulation;

sensing the pressure differential across a pump which circulates said coating material formulation through said combining means;

producing third output dependent on the sensed pressure differential across said pump;

controlling the flow of at least one of the liquid coating composition and the supercritical fluid diluent which are combined with one another dependent on said third output to substantially maintain a selected ratio of supercritical fluid diluent to liquid coating composition in the coating material formulation within the recirculation loop;

transmitting the coating material formulation from the recirculation loop to one or more coating dispensers; and applying the coating material formulation onto a substrate.

30. The method of claim 29 in which said step of sensing the pressure differential comprises sensing the input pressure at the input side of the pump and sensing the output pressure at the output side of the pump, said step of controlling the flow of at least one of the supercritical fluid diluent and liquid coating composition comprising starting or stopping the flow of at least one of the supercritical fluid diluent and liquid coating composition in response to the sensed input pressure on the input side of the pump to maintain said input pressure within a selected range.

* * * * *